US012283750B2

(12) United States Patent

Naym et al.

(10) Patent No.: US 12,283,750 B2

(45) Date of Patent: Apr. 22, 2025

(54) LOW PROFILE MULTI BAND ANTENNA SYSTEM

(71) Applicant: Orbit Communication Systems Ltd., Netanya (IL)

(72) Inventors: Guy Naym, Netanya (IL); Ladislav Rudminsky, Qiryat Ata (IL); Alon Leib, Holon (IL); Binyamin Laufer, Petah Tikvah (IL); Hanan Keren, Kfar Sava (IL); Itzik Krepner, Netanya (IL); Ilan Halevi, Hod Hasharon (IL)

(73) Assignee: ORBIT COMMUNICATION SYSTEMS LTD., Netanya (IL)

( * ) Notice: Subject to any disclaimer, the term of this patent is extended or adjusted under 35 U.S.C. 154(b) by 912 days.

(21) Appl. No.: 17/292,490

(22) PCT Filed: Nov. 10, 2019

(86) PCT No.: PCT/IL2019/051226

§ 371 (c)(1),
(2) Date: May 10, 2021

(87) PCT Pub. No.: WO2020/095310

PCT Pub. Date: May 14, 2020

(65) Prior Publication Data

US 2022/0021111 A1 Jan. 20, 2022

Related U.S. Application Data

(60) Provisional application No. 62/757,188, filed on Nov. 8, 2018.

(51) Int. Cl.

| | |
|---|---|
| *H01Q 19/19* | (2006.01) |
| *H01Q 3/18* | (2006.01) |
| *H01Q 3/20* | (2006.01) |

(52) U.S. Cl.

CPC ............ *H01Q 19/192* (2013.01); *H01Q 3/18* (2013.01); *H01Q 3/20* (2013.01); *H01Q 19/19* (2013.01)

(58) Field of Classification Search

CPC .............................. H01Q 19/192; H01Q 3/20

See application file for complete search history.

(56) References Cited

U.S. PATENT DOCUMENTS 4,203,105 A * 5/1980 Dragone ............. H01Q 19/192 343/837

4,298,877 A * 11/1981 Sletten ..................... H01Q 3/18 343/837

5,790,077 A * 8/1998 Luh ...................... H01Q 19/192 343/781 CA (Continued)

*Primary Examiner* — Ab Salam Alkassim, Jr.

(74) *Attorney, Agent, or Firm* — Rivka Friedman

(57) ABSTRACT

A multi band antenna system for transmission and reception of electromagnetic signals in a low-profile dual reflector configuration with position-controlled main-reflector, and fixed sub-reflector and feed horn. An added linear slide of the main-reflector with respect to the sub-reflector synchronized with variable tilt angle of the main-reflector for compensation for the varied focal length in the main-reflector to the beam due the varied main-reflector tilt. The system achieves a beam elevation of 10° to 100° (full elevation), minimum gain variations over the full elevation travel, swept volume as per ARINC 791 (e.g. Boeing Radome or Airbus Radome), and can be used to meet wide-Tx/Rx bands requirements.

15 Claims, 23 Drawing Sheets

(56) References Cited

U.S. PATENT DOCUMENTS

| | | | | |
|---|---|---|---|---|
| 5,796,370 | A * | 8/1998 | Courtonne | H01Q 3/16 343/781 R |
| 5,844,527 | A * | 12/1998 | Takashima | H01Q 15/141 343/781 CA |
| 6,043,788 | A * | 3/2000 | Seavey | H01Q 3/20 343/781 CA |
| 6,198,455 | B1 * | 3/2001 | Luh | H01Q 19/192 343/781 CA |
| 6,225,957 | B1 * | 5/2001 | Yamaguchi | H01Q 15/0033 343/781 P |
| 6,266,024 | B1 * | 7/2001 | Ramanujam | H01Q 3/16 343/781 CA |
| 6,545,645 | B1 * | 4/2003 | Wu | H01Q 25/007 343/781 CA |
| 7,006,049 | B1 * | 2/2006 | Loane | H01Q 19/192 343/781 CA |
| 9,287,631 | B2 * | 3/2016 | Ahn | H01Q 19/132 |
| 11,069,973 | B1 * | 7/2021 | Veysoglu | H01Q 3/20 |
| 2002/0011962 | A1 * | 1/2002 | Luh | H01Q 19/192 343/781 P |
| 2003/0095075 | A1 * | 5/2003 | Ramanujam | H01Q 1/288 343/781 CA |
| 2004/0257289 | A1 * | 12/2004 | Geen | H01Q 19/17 343/781 CA |
| 2005/0168395 | A1 * | 8/2005 | Walker | H01Q 15/0013 343/781 CA |
| 2006/0250316 | A1 * | 11/2006 | Smith | H01Q 3/12 343/781 CA |
| 2006/0267851 | A1 * | 11/2006 | Turner | H01Q 19/192 343/781 R |
| 2008/0309569 | A1 * | 12/2008 | Berejik | H01Q 3/20 343/781 CA |
| 2009/0002245 | A1 * | 1/2009 | Park | H01Q 19/17 343/837 |
| 2014/0218256 | A1 * | 8/2014 | Tanabe | H01Q 19/13 343/837 |
| 2015/0084820 | A1 * | 3/2015 | Ahn | H01Q 19/17 343/781 CA |
| 2015/0349429 | A1 * | 12/2015 | Yun | H01Q 15/16 343/837 |
| 2016/0372835 | A1 * | 12/2016 | Toso | H01Q 15/16 |
| 2021/0313684 | A1 * | 10/2021 | Murray | H01Q 19/192 |

* cited by examiner

LOW-PROFILE ANTENNA SYSTEM

EXEMPLARY PARAMETERS (WITHOUT RADOME), E.G. @ KU-BAND, OTHER BANDS ARE AVAILABLE, SUCH AS: X, KA, K, V

| **Parameter** | **Ku-Band (Typ.)** |
|---|---|
| TX Range (GHz)<br>RX Range (GHz) | 13.75 – 14.5 GHz<br>10.7 – 12.75 GHz |
| Polarization | V / H and continuous polarization alignment, using a unique feed |
| XPD | 25 dB |
| G/T @ 30°Elevation, @ 11.7 GHz, LNB N.F of 0.7dB<br>Clear sky, @ 10 km altitude, without radome<br>*See detailed table/plot in the following slide | 11.86 dB/°K |
| EIRP @ 14.25 GHz with 20W BUC (Psat) | 45.05 dBW |

FIGURE 3A

EXEMPLARY PARAMETERS (WITHOUT RADOME), CONT. (E.G. @ KU-BAND, VALID FOR ALL BANDS)

| Parameter | Ku-Band |
|---|---|
| Azimuth Travel | Continuous (Slip-rings & Rotary Joint) |
| Elevation Travel<br>Other Optimizations are available | 10° to 100° (RF) |
| Polarization Travel | Continuous |
| Azimuth Velocity, Acceleration (in order to allow operation at high Elevation angles at aircraft motion of 5°/s) | 80°/s & 80°/s$^2$<br>(intermittent 180°/s & 180°/s$^2$) |
| Elevation, polarization Velocity & Acceleration | 50°/s & 50°/s$^2$<br>(intermittent 100°/s & 100°/s$^2$) |
| Pointing Error (3 sigma), not including IRU errors, IRU latency, vibration induced deflections, airframe deflections, radome beam squint, installation offsets or RSSI noise | Azimuth <0.2°<br>Elevation <0.2°<br>Polarization Compensation <0.4° |
| Swept Volume | Per ARINC 791 to meet standard IFC Radomes (e.g. Boeing) |
| Weight | <70 lbs. |
| Environmental Conditions | Per RTCA-DO-160G |

FIGURE 3B

G/T VS. ALTITUDE & ELEVATION ANGLE (E.G. @ KU-BAND)

| Beam El (φ°) @ Ku | G/T [dB/°K] @ 0 Km Altitude | G/T [dB/°K] @ 10 Km Altitude |
|---|---|---|
| 10 | 9.11 | 10.79 |
| 15 | 9.59 | 11.31 |
| 20 | 9.81 | 11.70 |
| 30 | 9.77 | 11.86 |
| 40 | 9.72 | 11.80 |
| 50 | 9.61 | 11.69 |
| 60 | 9.42 | 11.50 |
| 70 | 8.99 | 11.11 |
| 80 | 8.49 | 10.63 |
| 90 | 8.15 | 10.30 |
| 100 | 7.74 | 9.89 |

ANTENNA – PRELIMINARY GAIN LOSS BUDGET BASED ON PHYSICAL-OPTICS RAY-TRACING, DUE TO ANTENNA ELEVATION AND SUB-REFLECTOR BLOCKAGE

| Beam Elevation above Horizon (ϕº)↓ | ΔG [dB] | ΔGB [%] | ΔGB [dB] |
|---|---|---|---|
| 10 | 0.29 | 6.2% | 0.26 |
| 15 | 0.20 | 3.6% | 0.15 |
| 20 | 0.12 | 1.0% | 0.04 |
| 30 | 0.16 | 0.0% | 0.00 |
| 40 | 0.28 | 0.0% | 0.00 |
| 50 | 0.43 | 0.0% | 0.00 |
| 60 | 0.63 | 0.0% | 0.00 |
| 70 | 0.87 | 0.0% | 0.00 |
| 80 | 1.16 | 0.0% | 0.00 |
| 90 | 1.51 | 0.0% | 0.00 |
| 100 | 1.93 | 0.0% | 0.00 |
| | | | |
| Gain Drop → | 0.29 | 6.2% | Block (%) |

FIGURE 5

EXEMPLARY DIMENSIONS OF THE PARABOLIC-OVAL MAIN-REFLECTOR: FRONT VIEW
MAIN-REFLECTOR WIDTH PARABOLA (SECOND PARABOLIC SHAPE) 104WP
MAIN-REFLECTOR HEIGHT PARABOLA (FIRST PARABOLIC SHAPE 104HP

MAIN-REFLECTOR – 104
104W-EX. WIDTH 820MM
104H EXEMPLARY HEIGHT 180MM
Z-AXIS
X-AXIS
V-AXIS, VERTICAL
U-AXIS, HORIZONTAL, AZIMUTH

Ray Tracing Diagram of Low Profile Antenna System, employ Cassegrain Configuration at Az Plane with Optimal Gain, Sidelobes & Cross-Pol Ray Tracing Diagram of Low Profile Antenna System, employ Cassegrain Configuration at El Plane with Fare Gain, Sidelobes & Cross-Pol

Main Tilt Angle and Main to Sub Axial Distance versus Satellite Beam El Angle at Optimal Antenna Gain, Sidelobes & Cross-Pol performance

| 128<br>Beam El Angle (°) | 126<br>Main Tilt Angle (°) | 124<br>Main to Sub Axial Distance [cm] |
|---|---|---|
| | | |
| 30.0 | 15.0 | 46.7 |
| 70.0 | 35.0 | 58.9 |
| 100.0 | 60.0 | 79.8 |
| | | |

| | Reflector Dimensions | | |
|---|---|---|---|
| | | | |
| | Reflector Type | Width [cm] | Height [cm] |
| | | 104W | 104H |
| 104 | Main Reflector | 82.0 | 18.0 |
| | | 102W | 102H |
| 102 | Sub-Reflector | 50.0 | 18.0 |
| | | | |

FIGURE 12

Dual Band Capability e.g. Ku/Ka, (also X/Ka, X/Ku, etc.) using the similar optic concept, with the Dual Band Feed, based on Orbit US Patent # US 8,994,473,B2

ANTENNA PATTERNS, SATCOM REGULATIONS, EIRPSD VS. SKEW ANGLE, (E.G. @ KU-BAND)

Based on the simulated antenna patterns, analyses for the expected EIRPsd [dBW/40KHz] in the Airborne Low Profile Antenna of 82x18 cm², e.g. vs. FCC 25.222/7

LOW PROFILE MULTI BAND ANTENNA SYSTEM

FIELD OF THE INVENTION

The present invention generally relates to antennas, and in particular, it concerns a low-profile antenna with full elevation and multi-band transmit and receive.

BACKGROUND OF THE INVENTION

Low-profile antennas are smaller in height than typical full-sized antennas, typically enclosed under radomes of height of 25 cm. For example, the industry standard (Boeing) 24 cm, or even (Airbus) 20 cm low-profile radomes. Conventional low-profile antennas have limited elevation (altitude, up/down) and/or frequency bandwidth and/or high-power use, and/or cumbersome waveguide arrays. The low-profile capability is desired by the industry in order to minimize aerodynamic drag (reducing fuel consumption) in airborne applications, and in order to minimize radome silhouette in ground mobile systems.

SUMMARY OF THE INVENTION

An innovative antenna system includes a variable axis to deploy a main-reflector at a variable distance from a sub-reflector while synchronizing the variable distance with the tilt of the main-reflector.

According to the teachings of the present embodiment there is provided a system including: a main-reflector: having a first parabolic shape in a first direction, and having a second parabolic shape in a second direction, the first shape different from the second shape, the first and second directions orthogonal, a sub-reflector: having a first concave shape in the first direction, and a feed, the main-reflector and the sub-reflector cooperating to focus an incoming target-beam of radiation on the feed.

In an optional embodiment, the first direction corresponds to an elevation direction and the second direction corresponds to an azimuth direction.

In another optional embodiment, the main-reflector in the azimuth plane is arranged in a Cassegrain configuration, and in the elevation plane is arranged in a Gregorian configuration.

In another optional embodiment, the main-reflector in the azimuth plane is arranged in a Cassegrain configuration, and in the elevation plane is arranged in a Cassegrain configuration.

In another optional embodiment, the main-reflector first parabolic shape having a corresponding first focus of an incoming target beam, the main-reflector second parabolic shape having a corresponding second focus of an incoming target beam, the sub-reflector concave shape is effectively elliptical and in the elevation direction having corresponding third focus and fourth focus, and the feed having a feed horn ISO phase center, the first focus coincident with the fourth focus, and the third focus coincident with the feed horn ISO phase center.

In another optional embodiment, the main-reflector first parabolic shape having a corresponding first focus of an incoming target beam, the main-reflector second parabolic shape having a corresponding second focus of an incoming target beam, and the sub-reflector concave shape is effectively elliptical and in the elevation direction having corresponding third focus and fourth focus, the feed having a feed horn ISO phase center, the first focus coincident with the feed horn ISO phase center.

In another optional embodiment, the main-reflector has a main-reflector height in the first direction, and a main-reflector width in the second direction, the main-reflector height less than the main-reflector width, and the sub-reflector has a sub-reflector height in the first direction, and a sub-reflector width in the second direction, the sub-reflector height less than the sub-reflector width.

In another optional embodiment, the sub-reflector has a planar shape in the second direction.

In an optional embodiment, further including: a controller operational for: tilting the main-reflector relative to the sub-reflector, and positioning the main-reflector relative to the sub-reflector, the positioning determined based on the tilting.

In another optional embodiment, the tilting of the main-reflector is at a tilt angle, the tilt angle relative to a linear axis and a main-reflector normal line, the linear axis is parallel to a line from the main-reflector mechanical center to the sub-reflector mechanical center, and the main-reflector normal line being perpendicular to the first parabolic shape at the main-reflector mechanical center, and the positioning being at a spacing distance between an origin and an axis normal, the origin being a normal line from the linear axis at a sub-reflector mechanical center, the axis normal being a normal line from the linear axis at the main-reflector mechanical center, and the spacing distance determined based on the tilt angle.

In another optional embodiment, the positioning of the main-reflector is also relative to the feed, the feed in a fixed relation to the sub-reflector.

In another an embodiment, further including a linear axis, the main-reflector operationally connected to the linear axis and the sub-reflector operationally connected to the linear axis, the main-reflector and the sub-reflector deployed on a top side of the linear axis, and the feed deployed on a bottom side of the linear axis, the top side opposite from the bottom side.

In another optional embodiment, the a main-reflector mechanical center is an area of connection between the main-reflector and mechanics, the mechanics deployed to move the main-reflector along a linear axis at least reversibly in the direction of the sub-reflector.

In another optional embodiment, a sub-reflector mechanical center is an area of connection between the sub-reflector and a linear axis.

According to the teachings of the present embodiment there is provided a system including: a main-reflector: having a first parabolic shape in an elevation direction, and having a second parabolic shape in an azimuth direction, the first shape different from the second shape, a sub-reflector: having a first concave shape in the elevation direction, and a feed, the main-reflector in an azimuth plane is focused on the sub-reflector in a Cassegrain configuration, and in an elevation plane is focused on the sub-reflector in a Gregorian configuration, the main-reflector and the sub-reflector cooperating to focus an incoming target-beam of radiation on the feed.

According to the teachings of the present embodiment there is provided a system including: a main-reflector: having a first parabolic shape in an elevation direction, and having a second parabolic shape in an azimuth direction, the first shape different from the second shape, a sub-reflector: having a first concave shape in the elevation direction, and a feed, the main-reflector in an azimuth plane is focused on the sub-reflector in a Cassegrain configuration, and in an elevation plane is focused on the sub-reflector in a Cassegrain configuration, the main-reflector and the sub-reflector cooperating to focus an incoming target-beam of radiation on the feed.

According to the teachings of the present embodiment there is provided a method for antenna positioning including: tilting a main-reflector relative to a sub-reflector, and positioning the main-reflector relative to the sub-reflector, the positioning determined based on the tilting, the main-reflector and the sub-reflector cooperating to focus an incoming target-beam of radiation on a feed, the main-reflector: having a first parabolic shape in a first direction, and having a second parabolic shape in a second direction, the first shape different from the second shape, the first and second directions orthogonal, the sub-reflector: having a first concave shape in the first direction.

In an optional embodiment, the first direction corresponds to an elevation direction and the second direction corresponds to an azimuth direction.

In another optional embodiment, the main-reflector in the azimuth plane is arranged in a Cassegrain configuration, and in the elevation plane is arranged in a Gregorian configuration.

In another optional embodiment, the main-reflector in the azimuth plane is arranged in a Cassegrain configuration, and in the elevation plane is arranged in a Cassegrain configuration.

In another optional embodiment, the main-reflector first parabolic shape having a corresponding first focus of an incoming target beam, the main-reflector second parabolic shape having a corresponding second focus of an incoming target beam, the sub-reflector concave shape is effectively elliptical and in the elevation direction having corresponding third focus and fourth focus, and the feed having a feed horn ISO phase center, the first focus coincident with the fourth focus, and the third focus coincident with the feed horn ISO phase center.

In another optional embodiment, the main-reflector first parabolic shape having a corresponding first focus of an incoming target beam, the main-reflector second parabolic shape having a corresponding second focus of an incoming target beam, and the sub-reflector concave shape is effectively elliptical and in the elevation direction having corresponding third focus and fourth focus, the feed having a feed horn ISO phase center, the first focus coincident with the feed horn ISO phase center.

In another optional embodiment, the tilting of the main-reflector is at a tilt angle, the tilt angle relative to a linear axis and a main-reflector normal line, the linear axis is parallel to a line from the main-reflector mechanical center to the sub-reflector mechanical center, and the main-reflector normal line being perpendicular to the first parabolic shape at the main-reflector mechanical center, and the positioning being at a spacing distance between an origin and an axis normal, the origin being a normal line from the linear axis at a sub-reflector mechanical center, the axis normal being a normal line from the linear axis at the main-reflector mechanical center, and the spacing distance determined based on the tilt angle.

In another optional embodiment, the positioning of the main-reflector is also relative to the feed, the feed in a fixed relation to the sub-reflector.

According to the teachings of the present embodiment there is provided a controller operational for: tilting a main-reflector, the tilting at a tilt angle, the tilt angle relative to a linear axis and a main-reflector normal line, and positioning the main-reflector relative to a sub-reflector, the positioning being a spacing between an origin and an axis normal, the spacing being a distance determined based on the tilting, the tilting and positioning configurating the main-reflector and the sub-reflector to cooperate to focus an incoming target-beam of radiation on a feed.

According to the teachings of the present embodiment there is provided a non-transitory computer-readable storage medium having embedded thereon computer-readable code for antenna positioning the computer-readable code including program code for: tilting a main-reflector relative to a sub-reflector, and positioning the main-reflector relative to the sub-reflector, the positioning determined based on the tilting, the main-reflector and the sub-reflector cooperating to focus an incoming target-beam of radiation on a feed, the main-reflector: having a first parabolic shape in a first direction, and having a second parabolic shape in a second direction, the first shape different from the second shape, the first and second directions orthogonal, the sub-reflector: having a first concave shape in the first direction.

BRIEF DESCRIPTION OF FIGURES

The embodiment is herein described, by way of example only, with reference to the accompanying drawings, wherein:

FIG. 3A and FIG. 3B, there is shown tables of exemplary parameters (without radome) of implementation in the Ku-Band.

FIG. 5, there is shown a table of antenna—preliminary gain loss budget based on physical-optics ray-tracing, due to antenna elevation and sub-reflector blockage.

FIG. 12, a chart of exemplary main-reflector tilt angles and corresponding and main-reflector to sub-reflector axial (spacing) distances for satellite beam elevation angles at optimal antenna gain, sidelobes, and cross-polarization performance.

DETAILED DESCRIPTION—FIGS. 1 TO 18

Figure 1:
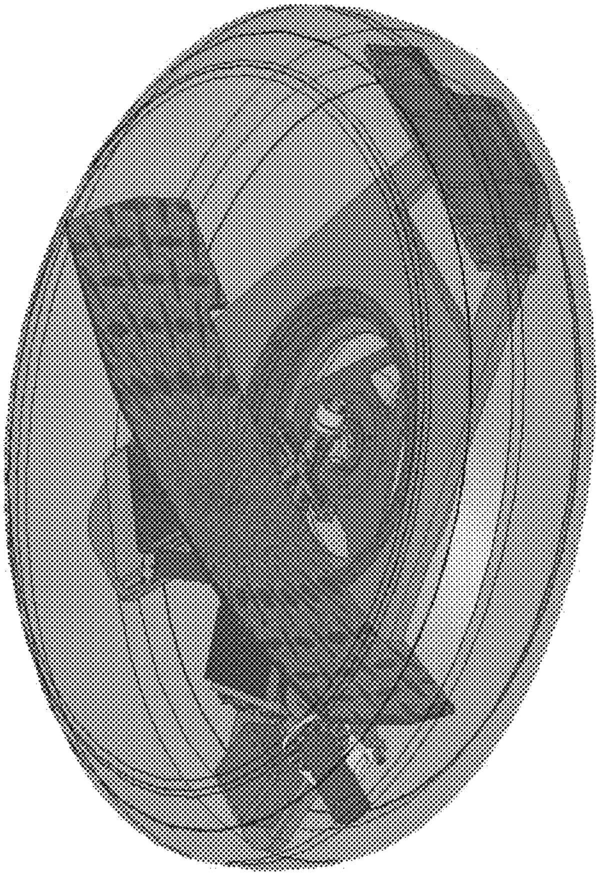
FIG. 1, there is shown a sketch of a low-profile airborne antenna system.

The principles and operation of the system according to a present embodiment may be better understood with reference to the drawings and the accompanying description. A present invention is a system for transmission (Tx) and reception (Rx) of electromagnetic signals. The system facilitates a low-profile solution with special optics for full elevation (el) in Tx and Rx. This system is cost effective, with better performance mainly in the compliance with Satcom regulations (as compared to other low-profile antennas), dual band capability, and accurate polarization compensation (at linear polarizations).

A current embodiment of a system and method for positioning an antenna is referred to in the context of this document as a "low profile antenna system" or "airborne low-profile antenna".

A current embodiment is a multi-band antenna system for transmission and reception of electromagnetic signals in a low-profile dual reflector configuration with position-controlled main-reflector, and fixed sub-reflector and feed horn. An added linear slide of the main-reflector with respect to the sub-reflector synchronized with variable tilt angle of the main-reflector for compensation for the varied focal length in the main-reflector to the beam due the varied main-reflector tilt. The system achieves a beam elevation of 10° to 100° (full elevation), minimum gain variations over the full elevation travel, swept volume as per ARINC 791 (e.g. Boeing Radome or Airbus Radome), and can be used to meet wide-Tx/Rx bands requirements.

The system facilitates:
- beam elevation of 10° to 100° (full elevation),
- minimum gain variations over the full elevation travel,
- swept volume as per ARINC 791 (e.g. Boeing Radome),
- Orbit proprietary design, and
- wide-Tx/Rx bands requirements.

The system is a low-profile dual reflector configuration with adjustable main-reflector, and fixed sub-reflector and feed horn. In this system, a unique design for low profile antennas, the minimum system height is limited only by the main-reflector height, e.g. 10 cm and higher (as the sub-reflector is typically shorter and lower than the main-reflector). This main-reflector height is compatible with the industry standard radomes, for example, from Boeing, Airbus, and ViaSat. This low-profile of the main-reflector is achieved in part by rotation in azimuth (az) together with varied tilt angle in the main-reflector only, typically at approx. 5° to +50° tilt, which corresponds to antenna beam elevation travel of 10° to 100°.

In addition, a feature of the current embodiment is a provision of a linear slide, the sliding synchronized with the varied tilt angle of the main-reflector for compensation for the focal length variations due to main-reflector tilt. The linear slide is used to compensate (move) the main-reflector location (in relation to the sub-reflector) to keep good performance of the antenna Gain, G/T, EIRPsd (EIRP Spectral Density), Cross-polarization, and side lobes level (for compliance with the worldwide Satcom regulations) over the entire elevation range and frequency used bandwidth.

The system can use RF front-end circuitry based on proven airborne operating systems, for example, a waveguide chain that includes:
- Special Feed, which includes accurate Polarization alignment (w/o cables/LNB/LNA rotation), thus, increases the reliability/product life
- OMT
- Tx & Rx Reject Filters
- Dual-band and multi-band feeds.

Features of the current embodiment include:
- Compliant with Satcom regulations.
- Minimum gain variations over the full antenna elevation travel of 10° to 100°—unlike conventional phased array solutions, which typically have 6-8 dB loss at low elevation angles.
- Wide Tx/Rx frequency bands are used in current implementations for Ku-band, inherent design of addition of wide Ka-band using the same antenna (using the patented dual band special feed)—unlike conventional panel/waveguide arrays/phased arrays.
- A high-performance antenna system (G/T & EIRPsd for given volume) with minimum Ohmic and RF path loss can be used—unlike conventional panel/waveguide arrays/phased arrays.
- A unique feed in the Ku-band can include accurate polarization alignment, over the full frequency and temperature range (without cables/LNB rotation), thus increasing the reliability/life—unlike conventional panel/waveguide arrays/phased arrays.
- High EIRPsd over the entire frequency range—unlike conventional planar array solutions in the market (which have problems with grating lobes). For example, typically 30 dBW/40 KHz @ 30° skew (see graph) with reference to the exemplary antenna size 18×82 cm, and will change for other antenna sizes, mainly heights, as suggested in this application.
- The use of "dish technology" facilitates features such as:
  - Cost effective antenna system with mature building blocks.
  - Relatively simple system (minimum components)—unlike the cumbersome waveguide arrays and phased arrays of existing systems.
  - Low power consumption due to "dish technology"—in comparison to power consumption of panel/waveguide arrays/phased arrays
  - Low weight—compared to cumbersome waveguide arrays currently used by other solutions.
  - High reliability—robust MTBF.
- Combination of a multi-band or dual band feed with a linear slide and corresponding shape of the sub-reflector.

In a preferred design for the low-profile antenna system, the maximum system height should be limited by the parabolic-oval main-reflector height only, which is limited by the low-profile aircraft radome, e.g. as low as 10 cm above the base plate of the antenna system at the radome base where the low profile radome should enclose at least the parabolic-oval main-reflector, the plano-concave (planar-concave) sub reflector. A standard corrugated feed (feed horn 100) can be inside the radome or below the radome. This enables a stable solution such as Cassegrain configuration in the azimuth (left-right/width) direction and Gregorian ray tracing configuration in the elevation (up-down/height) direction.

Accordingly, the innovative implementation for this low-profile antenna system the movement can be restricted to the parabolic-oval main-reflector 104 tilt synchronized with the main-reflector 104 linear slide (along the linear axis 108) for compensation of focal length variations as a result of the main-reflector 104 tilt (the tilt angle 126).

The plano-concave sub-reflector 102 and the standard corrugated feedhorn 100 can be fixed relative to each other and at fixed position relative to the antenna base plate (for example, the linear axis 108), for assuring that both beam focal spot distance and beam focal spot position will stay at a fixed center point (iso phase center 90F) within the standard corrugated feedhorn 100, while at the same time keeping that the parallel satellite beam 132 should evenly heat (impinge on, illuminate) the main-reflector 104 surface, which then being evenly reflected (beam 134) toward the sub-reflector 102, then focusing all the beam energy (beam 136) within the feedhorn 100 at the fixed point in the feed horn 100 center (iso phase center 90F).

The current embodiment is an innovative solution to the above constraints, at least in part assuring that in all beam elevation angles (beam angle 128) of interest the ray at the satellite beam 132 that heats the center point of the main-reflector 104 surface, should be then be reflected (as beam 134) preferably as exactly as possible, to the center point (typically implemented as the sub-reflector center 90S) of the sub reflector 102 surface. The beam should be then reflected (as beam 136) to the fixed point (iso phase center 90F) within the standard corrugated feedhorn 100 on the feed center, yielding a stable solution of Cassegrain configuration in the azimuth (left-right) direction and Gregorian ray tracing configuration in the elevation (up-down) direction, as stated above.

Note that in the context of this document, references to a "Cassegrain" configuration uses the general definition of an antenna system having a single focal point. A main characteristic is that the optical path (beam path) folds back onto itself, relative to the antenna (optical) system's main-reflector. In a configuration of two antennas, for example a main-reflector and sub-reflector, an input target beam to the main-reflector has a single focal point to a feed. This should not be confused with the "classic" definition of a Cassegrain as a combination of a primary concave mirror and a secondary convex mirror, as a preferred embodiment is described herein using a concave (secondary) sub-reflector.

Similarly, in the context of this document, references to a "Gregorian" configuration uses the general definition of an antenna system having two focal points. In a configuration of two antennas, for example a main-reflector and a sub-reflector, the main-reflector has a focal point between the main-reflector and the sub-reflector and the sub-reflector, has a focal point on a feed.

Referring to FIG. 1, there is shown a sketch of a low-profile airborne antenna system. This innovative low-profile solution includes special optics for full elevation travel (receive and transmit), eliminating the limited elevation travel of conventional antenna systems.

Figure 2:
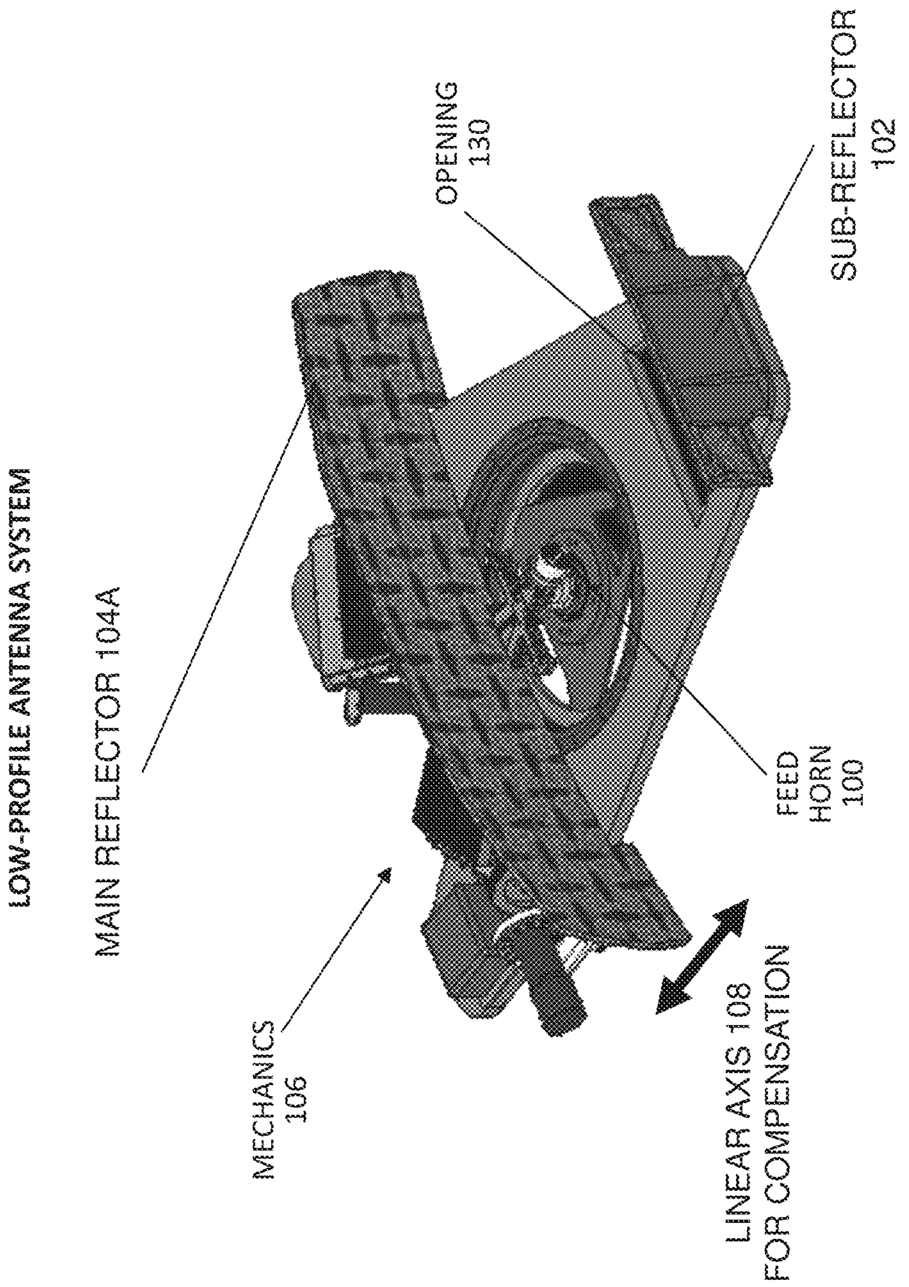
FIG. 2, there is shown a picture of an implementation of the low-profile antenna system.

Referring to FIG. 2, there is shown a picture of an implementation of the low-profile antenna system.

Referring to FIG. 3A and FIG. 3B, there is shown tables of exemplary parameters (without radome) of implementation in the Ku-Band.

Figure 4:
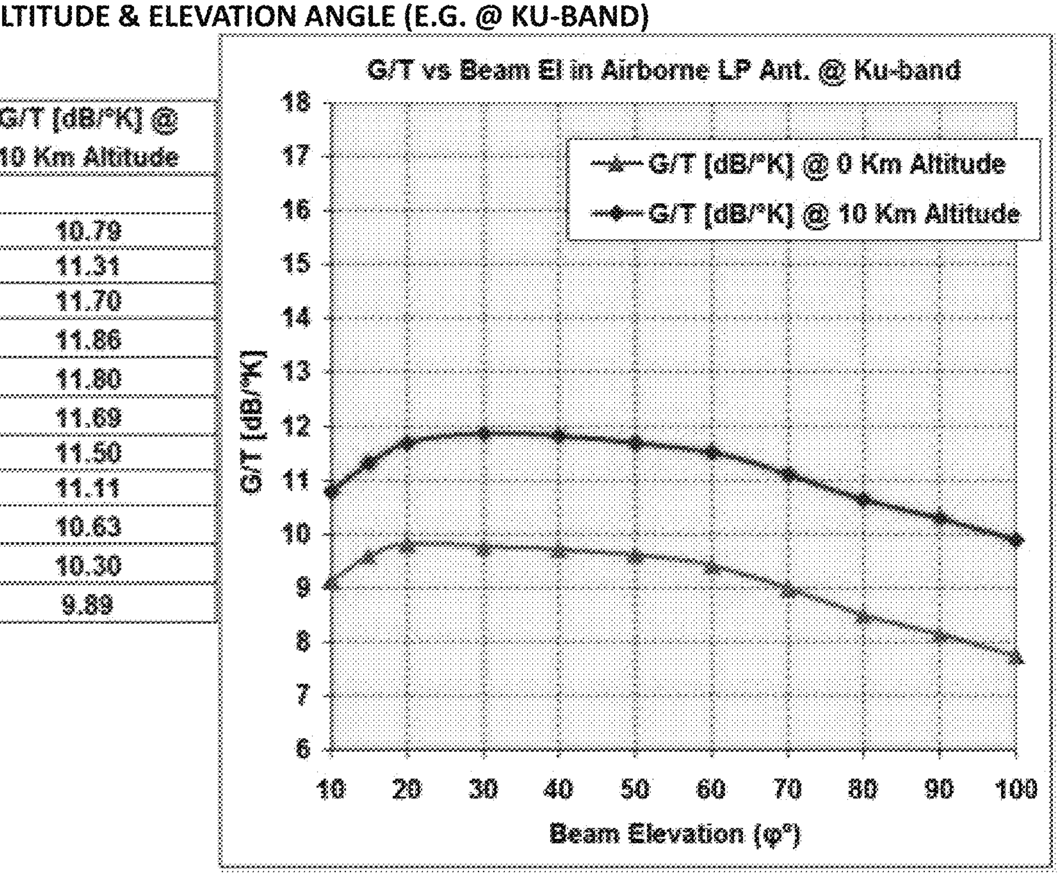
FIG. 4, there is shown a table and a plot of analysis.

Referring to FIG. 4, there is shown a table and a plot of analyzed plots for the expected G/T [dB/° K] in the airborne low profile antenna of 82×18 $cm^2$ at Ku-band in Rx of 11.7 GHz at 0 and 10 Km Altitudes, where the slight degradation toward beam elevation of 100° is due lower effective antenna cross section while the slight degradation toward beam elevation of 10° is due to the Sub Reflector blockage that seen by the antenna at ambient temperature. Presently an exemplary optimum G/T for the 10° to 100° elevation travel is at 30° elevation (11.86 dB/° K). If the optimization is required for higher elevation look angles (e.g. 70°) optimization can be done with approx. 0.5 dB improvement in gain at 70° elevation.

Referring to FIG. 5, there is shown a table of antenna—preliminary gain loss budget based on physical-optics ray-tracing, due to antenna elevation and sub-reflector blockage.

Note, elements in the figures are drawn for clarity, and may not be sized or positioned accurately. Based on this description, one skilled in the art will understand the relation and implementation of elements. In the figures, for clarity, generally, elements associated with a first position are suffixed with an "A" and elements associated with a second position are suffixed with a "B". Reference to the elements in general are not suffixed.

Figure 6A:
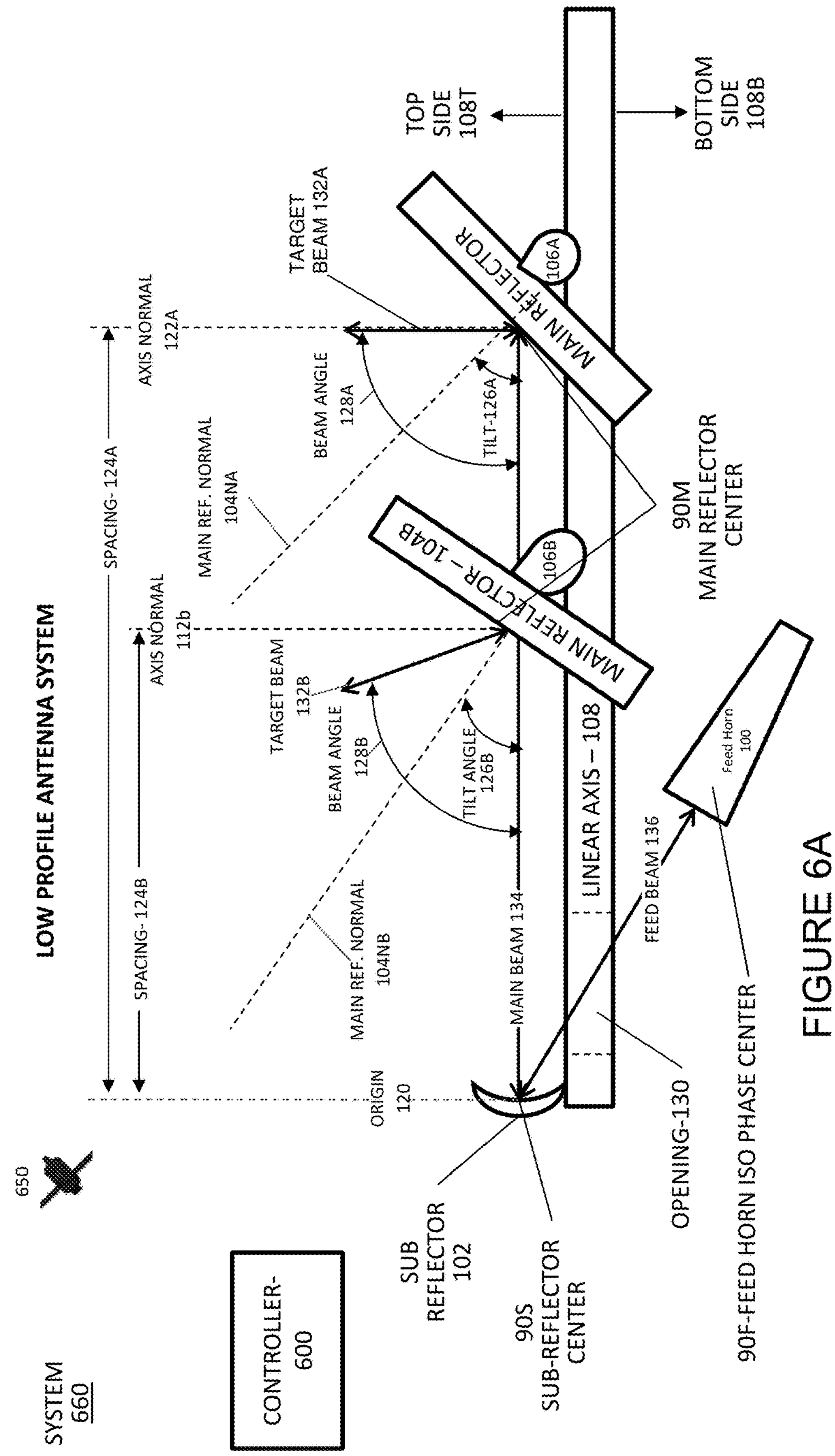
FIG. 6A, there is shown an exemplary implementation of a low-profile antenna system.

Referring to FIG. 6A, there is shown an exemplary implementation of a low-profile antenna system 660. A feed 100, also referred to as a typical implementation as a feed horn, is mounted below and facing a sub-reflector 102. The feed horn has an iso phase center 90F. A main-reflector 104 (also known as a "main-dish") is shown in two positions, a first position main-reflector 104A, and a second position main-reflector 104B. For convenience of reference in this description, the first position main-reflector 104A is also referred to as the far reflector 104A, and the second position main-reflector 104B is also referred to as the near reflector 104B. Note there is only one main-reflector in this example, and the terms "far" and "near" describe the position of the main-reflector. The main-reflector 104 is mounted on mechanics 106. A linear axis 108, which is representative of a physical object akin to a linear and planar plate or object, is between and connects the positioning of the sub-reflector 102 and the main-reflector 104. The linear axis 108 is generally parallel to a line from a main-reflector mechanical center 90M to the sub-reflector mechanical center 90S. Alternatively, the linear axis 108 can be described as a line from the main-reflector mechanical center 90M to the sub-reflector mechanical center 90S. Alternatively, the linear axis (108) is a line from the main-reflector mechanical center (90M) to the sub-reflector mechanical center (90S), the main-reflector first focus (90N) is coincident with (substantially on) on the linear axis (108), and the sub-reflector fourth focus (90G) is coincident with (substantially on) the linear axis (108).

For reference in this description, the linear axis 108 is shown with a top side 108T and a bottom side 108B. The top side 108T is on an opposite side of the linear axis 108 from the bottom side 108B. In a typical configuration, the feed 100 is configured on the bottom side 108B and the sub-reflector 102 and main reflector 104 are deployed on the top side 108T of the linear axis 108.

For reference, an origin 120 is shown normal to the linear axis 108 at the position of the sub-reflector 102. Typically, the normals to the linear axis are at the mechanical centers where the elements are connected and/or moved (positioned). For example, the constructed origin line 120 is typically defined at the sub-reflector at a sub-reflector (mechanical) center 90S, where the sub-reflector is operationally attached in relation to the linear axis 108. Similarly, an axis normal 122A is a first normal to the linear axis 108 at the first position main-reflector 104A, typically at the main reflector center 90M where the main-reflector 104 is attached in relation to the linear axis 108. Similarly, an axis normal 122B is a second normal is to the linear axis 108 at the second position main-reflector 104B. Similar to the notation used with the main-reflector being positioned far or near, the first normal 122A is also referred to as the far normal 122A, or the far position, and the second normal 122B is also referred to as the near normal 122B, or the near position. A first spacing 124A is a distance between the origin normal line 120 and the far normal 122A. Similarly, a second spacing 124B is a distance between the origin 120 and the near normal 122B.

A target beam 132 is shown as a representation of the signal of interest for the system to receive and/or transmit. The target beam 132 is an exemplary middle ray from the actual width of the received/transmitted signal. Typically, the target beam 132 is from the main reflector center 90M toward the target of interest 650, such as an orbiting satellite. A beam angle 128 is defined as an angle between (relative to) the target beam 132 and the linear axis 108. Exemplary target beam 132A is shown at the far position of the main-reflector 104A at a 90-degree beam angle 128A. Similarly, exemplary target beam 132B is shown at the near position of the main-reflector 104B at a 70-degree beam angle 128B.

An elevation, or tilt angle 126 of the main-reflector 104 is relative to the linear axis 108, and as described in detail elsewhere synchronized for tilt angle 126 of the main-reflector 104 with the spacing distance between the main-reflector 104 and the sub-reflector 102. A main-reflector normal 104N is defined being perpendicular to the main-reflector 104 at the main-reflector mechanical center 90M. The tilt angle 126 is between (relative to) the linear axis 108 and the main-reflector normal 104N. In the current exemplary cases, in the far position the main reflector 104A has a corresponding tilt angle 126A between the main-reflector normal 104NA and the linear axis 108. Similarly, in the near position the main reflector 104B has a corresponding tilt angle 126B between the main-reflector normal 104NB and the linear axis 108.

A main beam 134 is between the main-reflector 104 and the sub-reflector 102. The main beam 134 is an exemplary middle ray from the actual width of the received/transmitted signal between the reflectors. The main beam is typically centered on (middle ray aligned with) the mechanical centers (90S, 90M) of the sub- and main-reflectors.

Similarly, the feed beam 136 is between the sub-reflector 102 and the feed 100. The feed beam 136 is an exemplary middle ray from the actual width of the received/transmitted signal between the sub-reflector 102 and the feed 100. The feed beam is typically centered on (middle ray aligned with) the mechanical center 90S of the sub-reflector and the feed horn iso phase center 90F.

A controller 600 is operationally connected to the various elements of the system. The controller 600 can control functions including, but not limited to the moving and positioning of the main reflector 104 along the linear axis 108 to change the spacing 124. The controller 600 can also rotate and position the main reflector 104 at the desired tilt angle 126. Typically, the entire system 660 (not including the controller 600) is mounted on a turntable (670, not shown in the current figure, see FIG. 10), and the controller 600 is operable to control the turntable, thus rotating the system including the reflectors and feed in a radome. Additional and optional functions include controlling the transmission/reception at the feed horn 100, measurement of operational parameters, signal strengths, control feedback loops, and related system functions.

The feed horn 100 can be a conventional feed horn typically in a fixed relation to the sub-reflector 102 and used to Tx/Rx signals to/from the fixed sub-reflector 102. The feed horn 100 can be chosen as appropriate for the desired application. The feed horn may be a single-band feed, or a multi-band feed such as disclosed in U.S. Pat. No. 8,994,473 to Orbit Communication Ltd for "Multi-band feed assembly for linear and circular polarization".

The sub-reflector 102 can also be chosen as appropriate, for example, the size, angle, and shape (parabolic, hyperbolic, flat, etc.) can be chosen as appropriate for the application. In the current figure, the current embodiment of a low-profile system uses a planar-concave shaped sub-reflector. In the current figure, the feed horn 100 is configured below the sub-reflector 102 and below the linear axis 108. An opening 130 in the linear axis is shown as the area between dashed lines, providing a communication path between the feed horn 100 and the sub-reflector 102.

The main-reflector can be adjusted in elevation (up/down) and azimuth (left/right) by the mechanics 106, as is known in the art. Conventional implementations at a typical beam elevation angle 128 of 70° is achieved by tilting the main-reflector elevation axis at 35° tilt angle 126 relative to the normal direction 122A or 122B, then adjusting the elevation angle down to 10° by tilting the main-reflector elevation axis down to 5° relative to the normal direction 122A or 122B, i.e. tilting down the main-reflector at 30° relative to the initial tilt of 35°, or adjusting the elevation angle up to 100° by tilting the main-reflector elevation axis to 50° relative to the normal direction 122A or 122B, i.e. tilting up the main-reflector at 15° relative to the initial tilt of 35°. This results in providing a conventional elevation range from 10° to 100°.

A feature of the current embodiment is the innovative addition of moving the main-reflector 104 to change a spacing between the main-reflector 104 and the sub-reflector 102. A second feature of the current implementation is adjusting the tilt angle 126 of the main-reflector elevation axis relative to the normal direction 122 or 122 by exemplary ±22.5°, which adjusts the beam angle 128 by ±45° or 90° peak to peak, thus providing by this combination of features beam elevation range of 10° to 100°.

A third feature of the current embodiment is the combination of the planar-concave sub-reflector 102 and the main-reflector 104 being a parabolic-oval, having two perpendicular parabolic shapes, one (a first) parabolic shape 104HP in the elevation direction, and another (a second) parabolic shape 104WP in the azimuth direction. The parabolic shapes (104HP, 104WP) are curvature profiles, a first curvature profile (104HP) and second curvature profile (104WP) each having respective foci on respective normals defining the curvature (parabola) and respective off-axis foci from incident beams.

In the current implementation example, the mechanics 106 are additionally configured to provide movement of the main-reflector 104, for example a linear slide, reversibly in the direction of the sub-reflector 102. The main-reflector 104 can be reversibly moved in a direction of the linear axis 108, substantially parallel and/or aligned with the linear axis 108. Based on the current description, one skilled in the art will be able to implement mechanics 106 to provide movement of the main-reflector 104 and adjust the spacing 124 for the desired Tx/Rx parameters. Refer again to FIG. 2 shows an implementation of mechanics 106 including several elements behind and below the main-reflector, including the sub reflector 102 and the feed horn 100.

Based on this description, the linear axis 108 can be implemented by one skilled in the art to satisfy system design requirements and operational parameters. For example, FIG. 6 shows a side view of the linear axis 108, however it is apparent from FIG. 2 top view that the linear axis 108 can be implemented as a complex structure. The linear axis 108 serves as a reference for the spacing distance 124, alignment, direction, and positioning of the main-reflector 104 and the sub-reflector 102.

The movement of the main-reflector 104 can be between the first spacing 124A and the second spacing 124B. This movement of the main-reflector 104 is not limited to the two exemplary positions (far and near), and other positions along the linear axis 108 can be used as appropriate. If the first spacing 124A is the maximum distance from the sub-reflector 102, and the second spacing 124B is the minimum distance from the sub-reflector 102, then the available movement, or range of compensation is the difference between the spacings (124A minus 124B). For example, a compensation range may be 14 cm (±7 cm from an intermediate position between the far position and the near position). The current example of 14 cm (±7 cm) is non-limiting, and other ranges are possible, for example +16 cm to −8 cm. In an example of use, the main-reflector 104 is located as the first position main-reflector (far reflector) 104A at the first spacing 124A from the sub-reflector 102. The main-reflector 104 can be moved toward the sub-reflector 102 to be located as the second position main-reflector (near reflector) 104B at the second spacing 124B from the sub-reflector 102. If the far position 122A is at the maximum spacing (distance), and the near position 122B is at the minimum spacing (distance), then the main-reflector can be moved to a position anywhere between and including the far position 122A and near position 122B.

The current implementation has been described as adjusting the main-reflector 104 with respect to the sub-reflector 102. While the opposite can be done—adjusting the sub-reflector 102 together with the feed horn 100 with respect to the main-reflector 104, this generally introduces more complexity to the system. The feed 100 may also be moved at the same time or at a different time as the main-reflector 104 if desired/required.

Figure 6B:
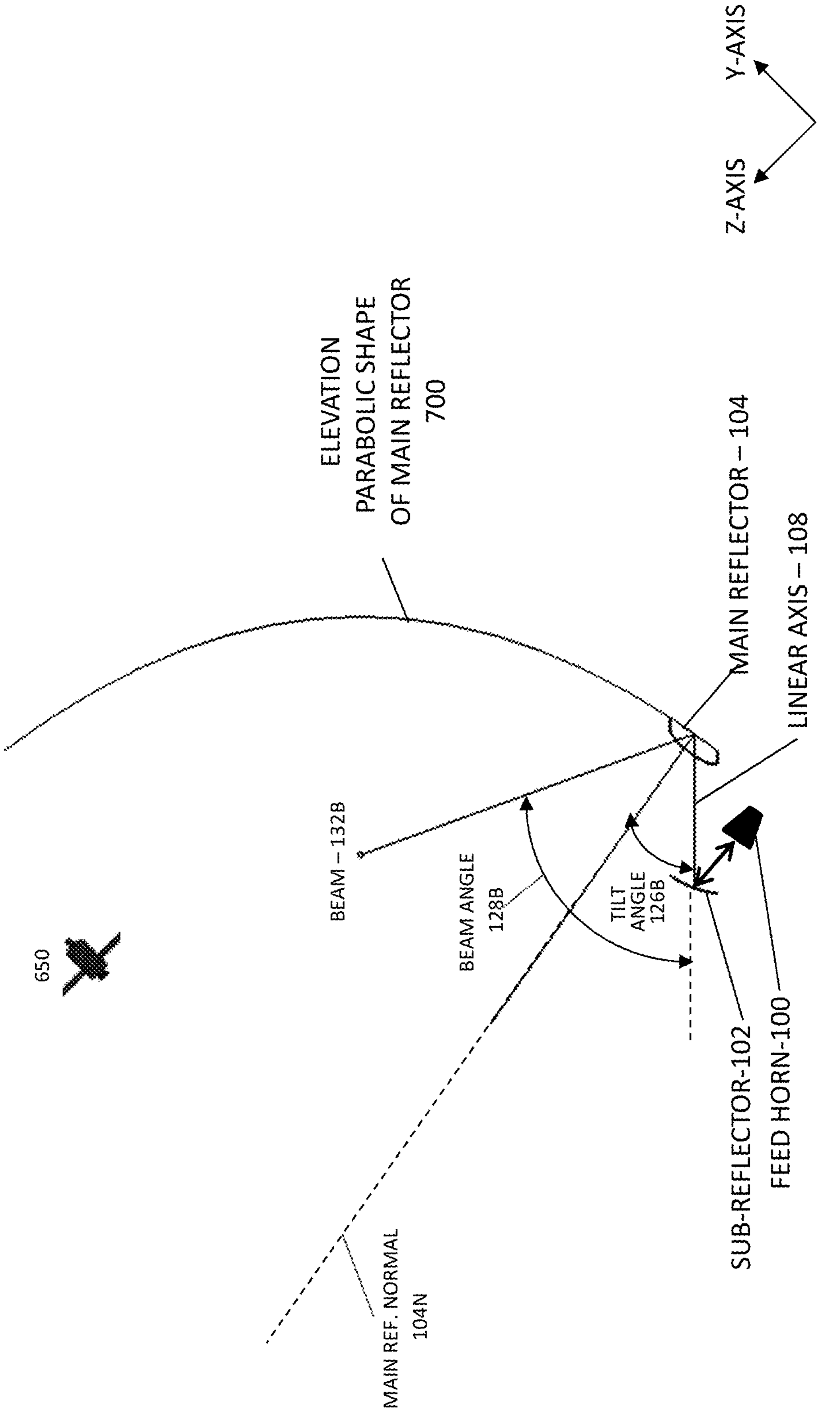
FIG. 6B, there is shown an elevation view of the parabolic shape of the main reflector.

Referring to FIG. 6B, there is shown an elevation view of the parabolic shape of the main reflector. The main reflector 104 has a parabolic shape in both the azimuth (left-right, shown in the current figure as in-out of the page) and elevation (up-down) directions. A significant feature of the current embodiment is that the parabolic shapes in each direction is typically different. In the current figure, the main-reflector 104 elevation parabolic shape 700 is shown. The actual main-reflector 104 is a portion of the elevation parabolic shape 700.

Figures 7A, 7B, 7C:
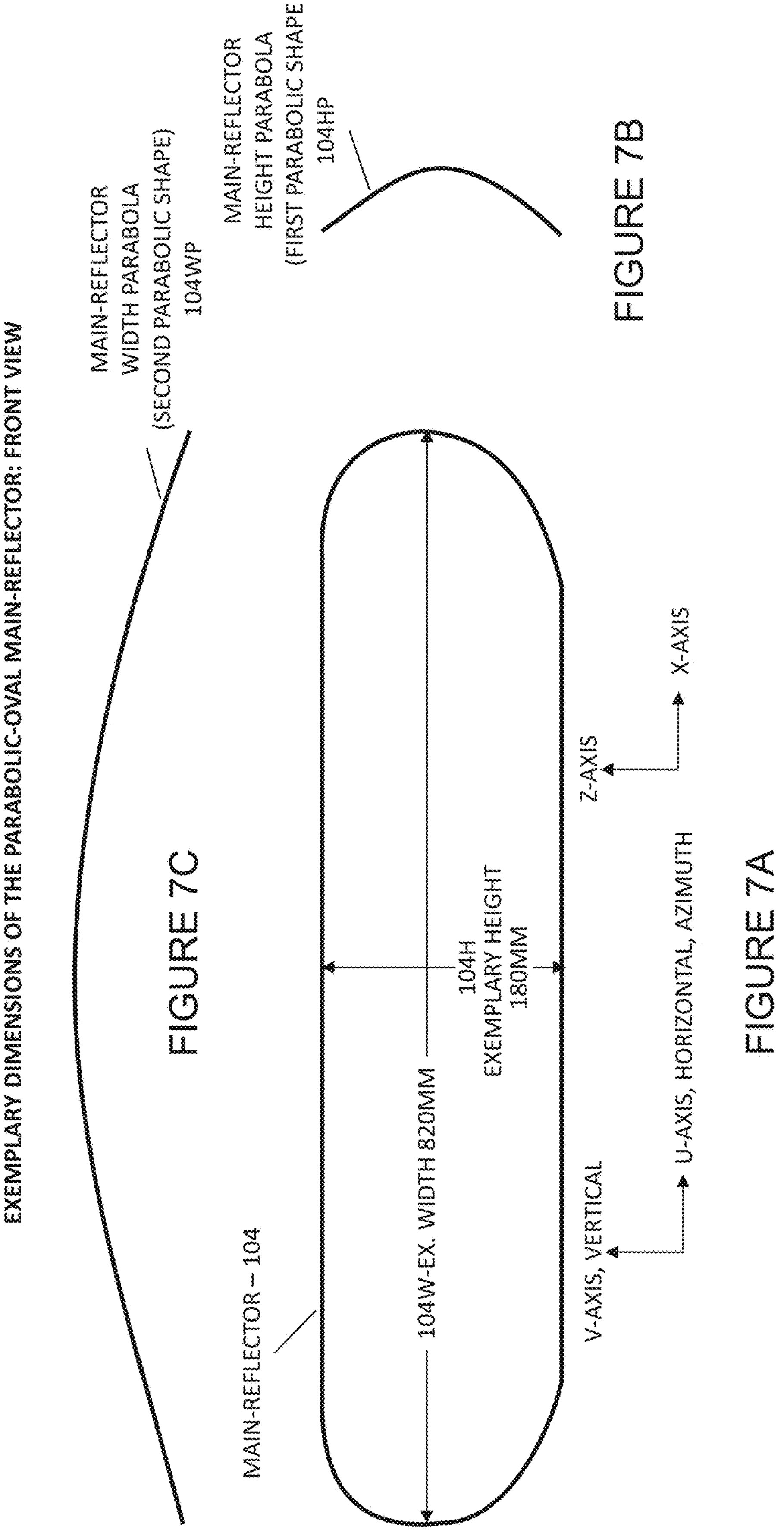
FIG. 7A, a front view of the parabolic-oval main-reflector.
FIG. 7B, there is shown a side-view (elevation view) of the main-reflector.
FIG. 7C, there is shown a top-view (azimuth view) of the main-reflector.

Refer also to FIG. 7A, a front view of the parabolic-oval main-reflector 104. Unlike conventional circular antennas, the main-reflector 104 is a portion, referred to an "oval", of a conventional dish antenna with a circular edge (circumference). The main-reflector 104 has a main-reflector height 104H shown in the vertical (v-axis or z-axis, elevation direction). The main-reflector 104 has a main-reflector width 104W shown in the horizontal (u-axis or x-axis, azimuth direction). Exemplary values of the main-reflector height 104H of 180 mm and main-reflector width 104W of 820 mm are shown.

Referring to FIG. 7B, there is shown a side-view (elevation view) of the main-reflector 104. The main-reflector 104 has a first parabolic shape 104HP in a direction of the main-reflector height 104H, along the elevation (v-axis). The first parabolic shape 104HP is of the reflecting surface of the main-reflector 104.

Referring to FIG. 7C, there is shown a top-view (azimuth view) of the main-reflector 104. The main-reflector 104 has a second parabolic shape 104WP in a direction of the main-reflector width 104W, along the azimuth (x-axis). The second parabolic shape 104WP is of the reflecting surface of the main-reflector 104.

In other words, the first parabolic shape 104HP is a first shape that is a first parabola, and similarly the second parabolic shape 104WP is a second shape that is a second parabola.

Typically, the main-reflector 104 is asymmetric, the first and second parabolic shapes being different. Parabolic surfaces can be described in three dimensions by following typical parabolic surface equation for a surface height 'z' above the x-y plane:

$$z=x^2/(4fa)+y^2/(4fb)$$

Where 'fa' in this equation is the focal distances of the parabolic surface (second parabolic shape 104WP) on the normal to the azimuth axis, which together with the horizontal planar shape (planar shape 102WP) of the sub-reflector 102 focuses the feed beam 136 on the iso-phase center 90F inside the feed horn 100, thus forming a Cassegrain configuration that is characterized by one focal point (90C Cassegrain az focus). In addition, 'fb' in this equation is the focal distances of the parabolic surface (first parabolic shape 104HP) of the main-reflector 104 on the normal to the elevation axis forming the focal line (90G Gregorian line focus) between the main- and sub-reflector centers, which then illuminates the concave shape (concave shape 102HP) of the sub-reflector 102, which in turn focuses the satellite beam (target beam 132) in the elevation direction also the feed beam 136 on the iso-phase center 90F inside the feed horn 100, thus forming a Gregorian configuration, which is characterized by more than one focal point/line.

Normally a symmetric, parabolic dish reflector has a corresponding single focus point. In contrast, the sub-reflector 102 has a planar shape 102WP in the azimuth direction resulting in a corresponding focus line 90G (Gregorian line focus, shown in FIG. 9). The position of the sub-reflector focus line 90G coincides with the concave focal distance (ray optics point focus 90T, also referred to in the context of this document as a "third focus") of the concave shape 102HP of the sub-reflector 102 in the elevation direction when in the Gregorian configuration shown in FIG. 11.

Figure 8B:
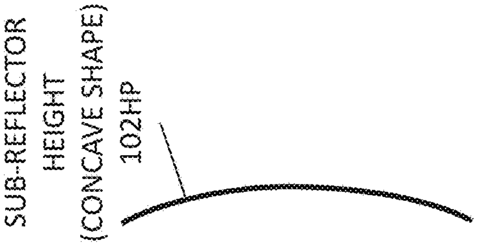
FIG. 8B, there is shown a side-view (elevation view) of the sub-reflector.
Figure 8C:
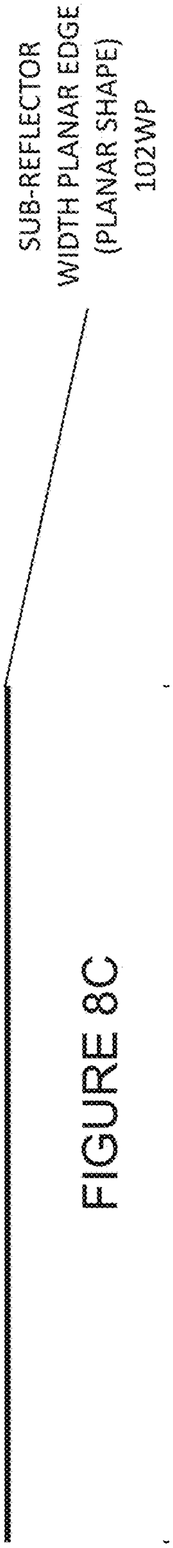
FIG. 8C, there is shown a top-view (azimuth view) of the sub-reflector.
Figure 8A:
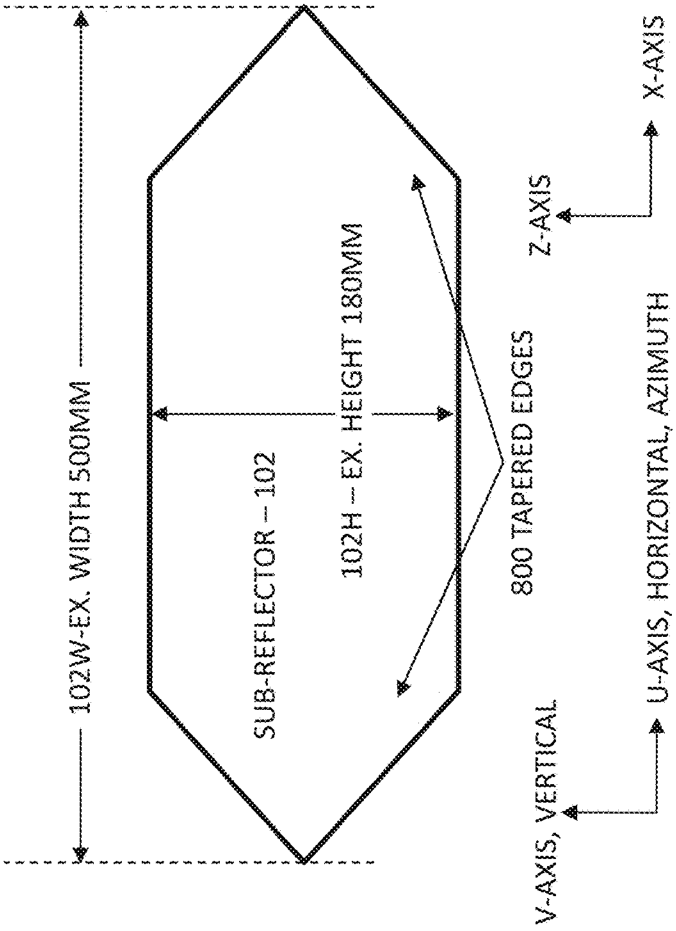
FIG. 8A, there is shown a front view of the planar-concave sub-reflector.

Referring to FIG. 8A, there is shown a front view of the planar-concave sub-reflector 102. The sub-reflector 102 has a sub-reflector height 102H shown in the vertical (v-axis or z-axis, elevation direction). The sub-reflector 102 has a sub-reflector width 102W shown in the horizontal (u-axis or x-axis, azimuth direction). Exemplary values of the sub-reflector height 102H of 180 mm and sub-reflector width 102W of 500 mm are shown. Preferably, the edges 800 of the sub-reflector are tapered to reduce far side-lobe level at skew of 0°.

Referring to FIG. 8B, there is shown a side-view (elevation view) of the sub-reflector 102. The sub-reflector 102 shape in the elevation (height) direction is best understood as concave, based on a portion of an ellipse (which by definition has two foci, discussed below). The sub-reflector 102 has a first concave shape 102HP) in a direction of the sub-reflector height 102H. The concave shape 102HP is of the reflecting surface of the sub-reflector 102. Note that one skilled in the art can use a properly tuned parabolic shape instead of a strictly elliptical shape for the concave shape of the sub-reflector 102 in the elevation direction.

Referring to FIG. 8C, there is shown a top-view (azimuth view) of the sub-reflector 102. The sub-reflector 102 has a planar shape 102WP in a direction of the sub-reflector width 102W. The planar shape 102WP is of the reflecting surface of the sub-reflector 102.

Figure 9:
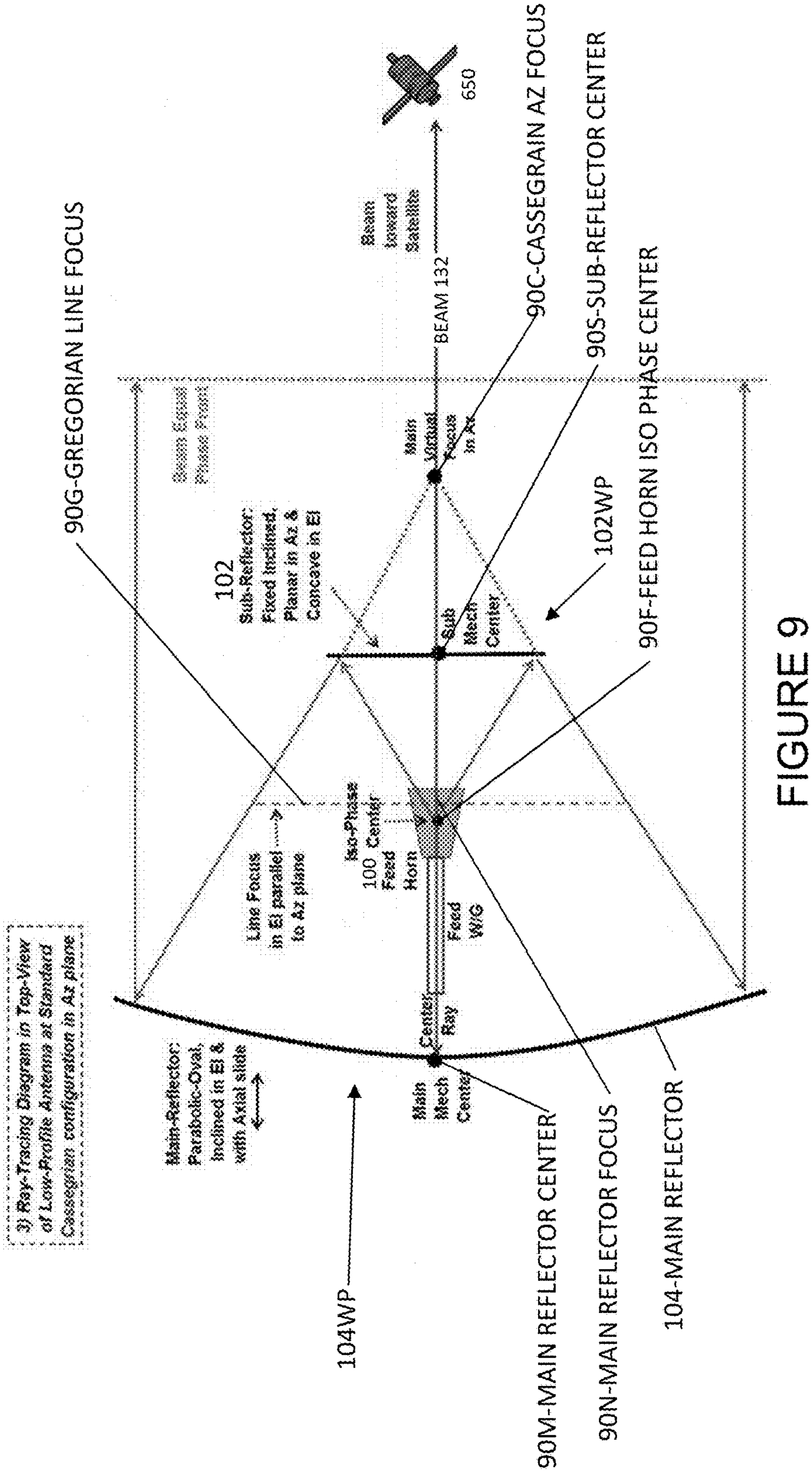
FIG. 9, there is shown a ray tracing diagram of the low-profile antenna system, employing a Cassegrain configuration in the azimuth plane.

Referring to FIG. 9, there is shown a ray tracing diagram of the low-profile antenna system, employing a Cassegrain configuration in the azimuth plane. This configuration enables optimal gain, with fair sidelobes and fair cross-polarization performance. The second parabolic shape 104WP of the main-reflector 104 can be seen along the azimuth (x-axis). The second parabolic shape 104WP has a corresponding second focus 90C. The second parabolic shape 104WP in combination with the spacing 124A configures the azimuth plane of the antenna system in a Cassegrain configuration with the second focus 90C being a main virtual focus (Cassegrain azimuth focus 90C). The main-reflector 104 is on a first side of the sub-reflector 102 and the main-reflector Azimuth direction second focus 90C is on a second side of the sub-reflector 102, the second side opposite the first side.

Figure 10:
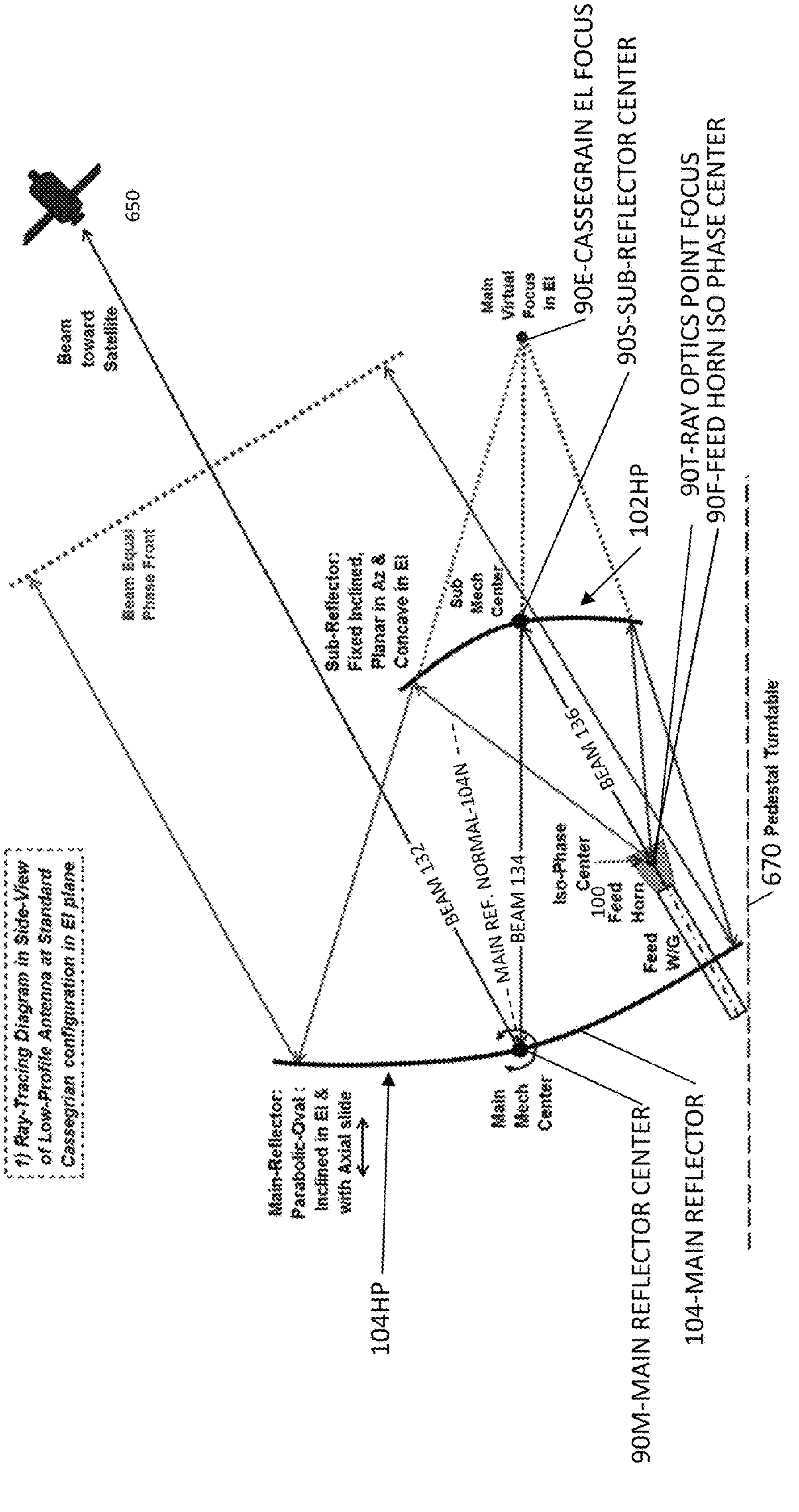
FIG. 10, there is shown a ray tracing diagram of the low-profile antenna system, employing a Cassegrain configuration in the elevation plane.

Referring to FIG. 10, there is shown a ray tracing diagram of the low-profile antenna system, employing a Cassegrain configuration in the elevation plane. This configuration has fare gain, fair sidelobes, and fair cross-polarization performance. The first parabolic shape 104HP of the main-reflector 104 can be seen along the elevation (v-axis). The first parabolic shape 104HP has a corresponding main virtual focus in elevation, a Cassegrain elevation focus, first focus 90E. The first parabolic shape 104HP in combination with the spacing 124A configures the elevation plane of the antenna system in a Cassegrain configuration with the first focus 90E being a main virtual focus (Cassegrain elevation focus 90E).

Note that in the context of this description, the focus being discussed may not be the mathematical focus defining the parabolic shape (that is on a normal to the curvature of the parabola). Typically, the focus being discussed is an "off-axis" focus of the beam direction, an angle other than normal to the curvature of the parabolic shape. For example, in the current figure, the main reflector normal 104N is shown perpendicular to the mechanical center 90M of the main-reflector. However, the Cassegrain elevation focus 90E is related to the target beam 132 reflecting toward the main beam 134 and is located on the main beam 134, not the main reflector normal 104N. Similarly, with the sub-reflector 102, the feed beam 136, and the ray optics point focus 90T. In some configurations, the focus may coincide with the mathematical focus on a normal to the parabola.

The main-reflector 104 is on a first side of the sub-reflector 102 and the main-reflector elevation direction first focus 90E is on the second side of the sub-reflector 102. The sub-reflector 102 optics together with the main-reflector 104 optics focuses the incoming/outgoing satellite beam at the ray optics point focus 90T.

Figure 11:
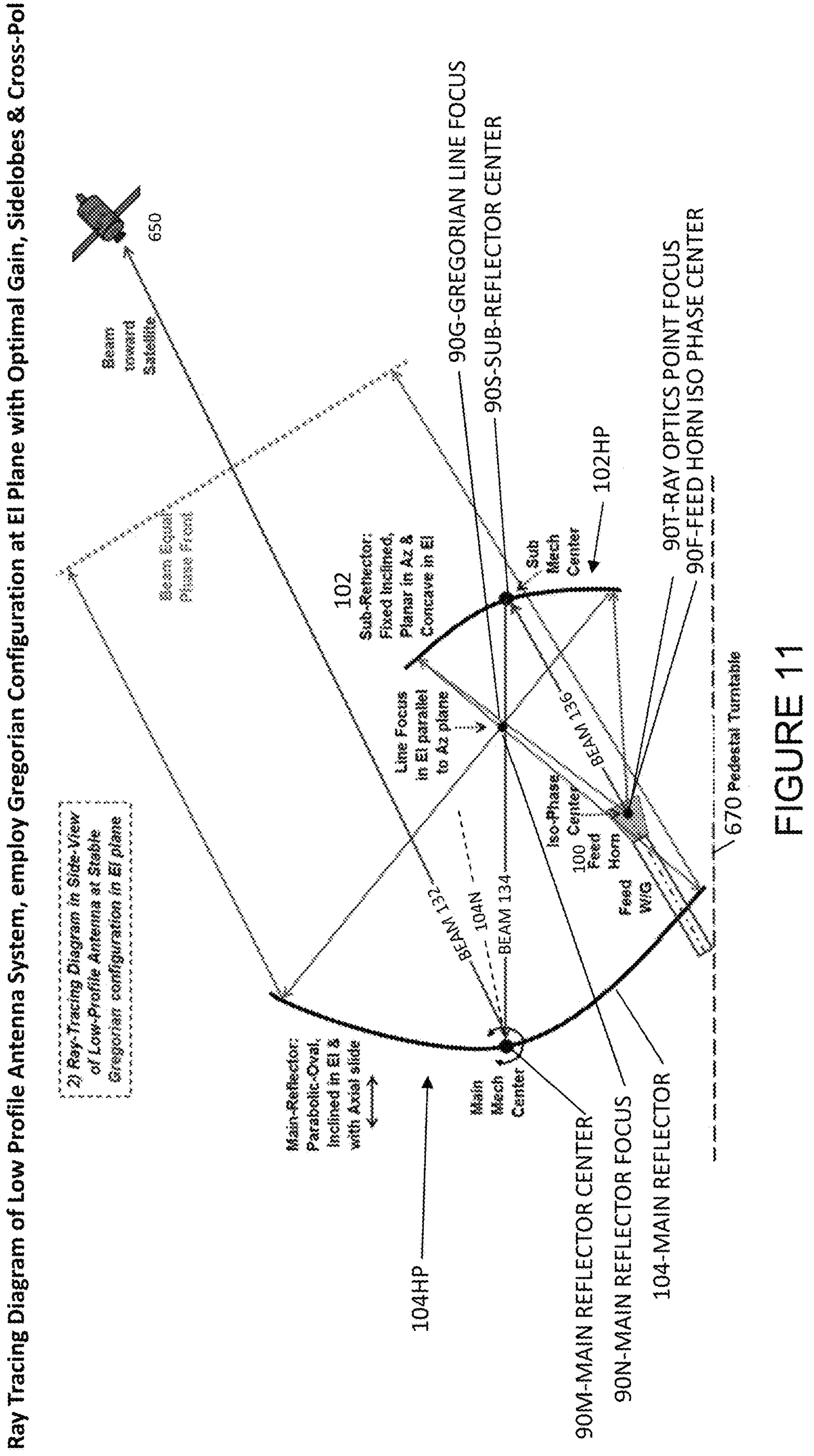
FIG. 11, there is shown a ray tracing diagram of the low-profile antenna system, employing a Gregorian configuration in the elevation plane.

Referring to FIG. 11, there is shown a ray tracing diagram of the low-profile antenna system, employing a Gregorian configuration in the elevation plane. This configuration has optimal gain, optimal sidelobes and optimal cross-polarization performance. In this configuration, the first parabolic shape 104HP of the main-reflector 104 can be seen along the elevation (v-axis). The first parabolic shape 104HP has a corresponding focus in elevation, in this case, a first-focus is a main-reflector focus 90N. In the current Gregorian elevation configuration, the main-reflector focus 90N is coincident with the sub-reflector 102 line of focus in elevation parallel to the azimuth plane, a Gregorian line focus, first focus 90G. The first parabolic shape 104HP in combination with the spacing 124A configures the elevation plane of the antenna system in a Gregorian configuration with the first focus 90N being a main focus (aligned with Gregorian elevation line focus 90G). The main-reflector 104 is on a first side of the sub-reflector 102 and the main-reflector focus 90N and the Gregorian line focus 90G are also on the first side of the sub-reflector 102.

Given the above configurations, the main-reflector 104 is tilted to the desired/required tilt angle 126 to operate with the beam angle 128 from the main reflector 104 to the target 650. As described above, the tilt angle 126 is relative to the linear axis 108 and the main-reflector normal 104N. Typically, the tilt angle 126 is approximately half of the beam angle 128 (half of the global elevation range).

Before, after, or during tilting of the main-reflector, the main-reflector 104 is also positioned relative to the sub-reflector 102.

As described above, the sub-reflector 102 has a first concave shape 102HP in a direction of the sub-reflector height 102H. The first concave shape 102HP having corresponding third focus 90T and fourth focus (90G or 90E, depending on configuration). The sub-reflector 102 has a planar shape 102WP in a direction of said sub-reflector width 102W.

Refer to FIG. 12, a chart of exemplary main-reflector tilt angles and corresponding and main-reflector to sub-reflector axial (spacing) distances for satellite beam elevation angles at optimal antenna gain, sidelobes, and cross-polarization performance. A feature of the current embodiment is the main-reflector 104 positioning being the spacing 124 between the origin 120 and the axis normal 122, the spacing 124 being a distance determined based on the tilting (tile angle 126). In addition, the main-reflector 104 first focus is aligned with the sub-reflector 102. The current figure shows exemplary beam angles 128 of 30°, 70°, and 100°. Respective tilt angles 126 of 15°, 35°, and 50° and determined distance of spacing 124 of 46.7 cm, 58.9 cm, and 79.8 cm for exemplary main-reflector 104 width 104W of 82.0 cm and height 104H of 18.0 cm, and sub-reflector 102 width 102W of 50.0 cm and height 102H of 18.0 cm.

In a case (described above) where the linear axis 108 is described as a line from the main-reflector mechanical center 90M to the sub-reflector mechanical center 90S, the main-reflector first focus 90N can be substantially on the linear axis, and the sub-reflector fourth focus 90G is substantially on the linear axis 108.

The positioning of the main-reflector 104 can also be relative to the feed 100. The feed 100 is typically in a fixed relation to the sub-reflector 102, so the sub-reflector third focus 90T is substantially aligned with the iso phase center 90F of the feed 100.

Figure 13:
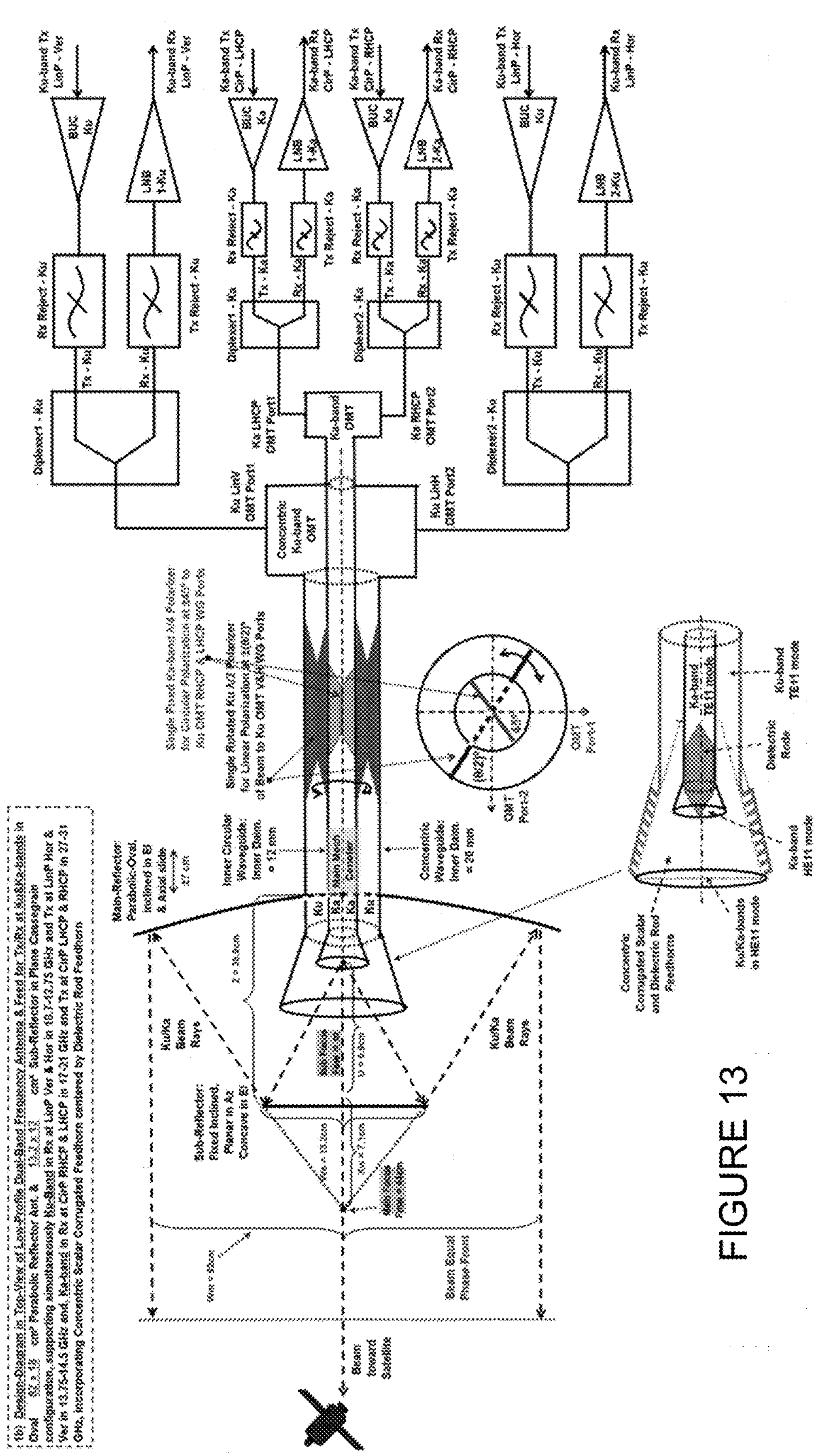
FIG. 13 there is shown dual band capability.

Referring now to FIG. 13 there is shown dual band capability e.g. ku/ka, (also x/ka, x/ku, etc.) using the similar optic concept, with the dual band feed, based on Orbit Communications Systems Ltd. U.S. Pat. No. 8,994,473.

Referring now to FIG. 14A to FIG. 14D, there are shown far field radiation patterns in the elevation plane out of combination of the main-reflector 104, sub-reflector 102, and feed-horn 100 configurations. The current figures are of a real design which was full scale simulated by CST Software.

Figure 14A:
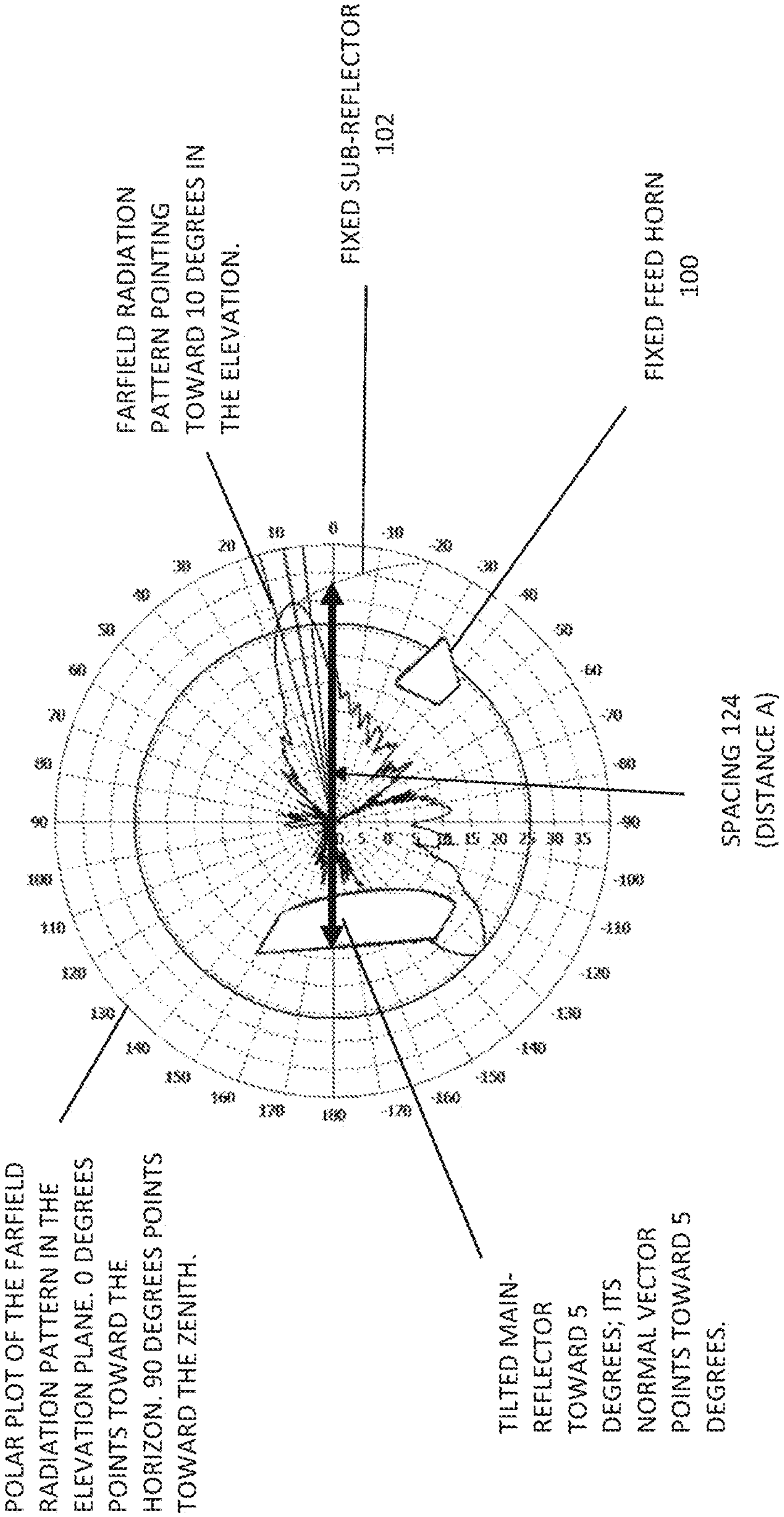
FIG. 14A to FIG. 14D, there are shown far field radiation patterns in the elevation plane out of combination of the main-reflector 104, sub-reflector 102, and feed-horn 100 configurations.

In FIG. 14A, the low-profile antenna system 660 from a side view, including the far field radiation pattern that derived from the specific optical configuration (antenna configuration) shown also in the same plot. The sub-reflector 102 and feed horn 100 are fixed. The main-reflector 104 is tilted (tilt angle 126) toward 5 degrees elevation, hence, the beam peak (target beam 132) points toward 10 degrees. For this elevation (practically, usually the lowest practical elevation), the main-reflector 104 is at a closest possible distance to the sub-reflector 102, that is the spacing 124 is the minimum distance required for this implementation case. This is shown in the current figure as a distance of "A" (spacing "A").

Figure 14B:
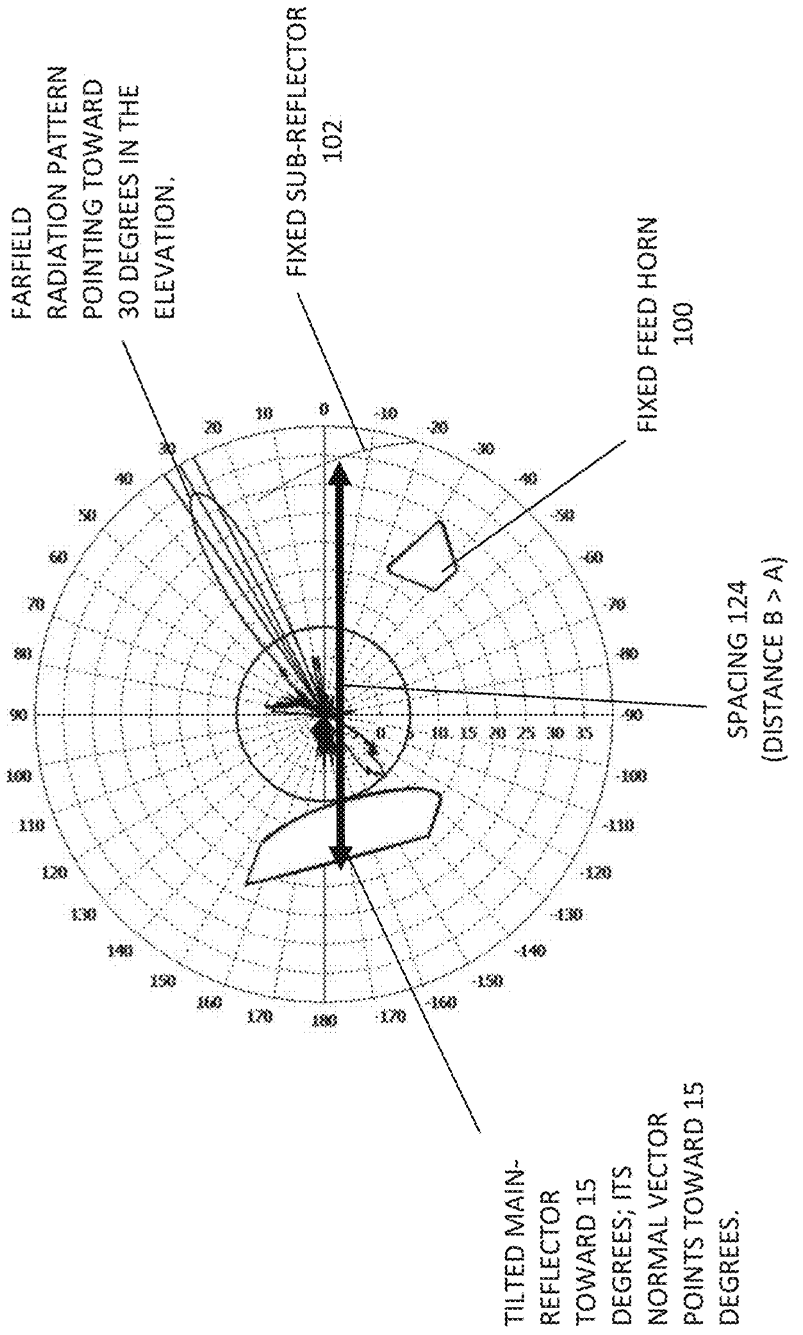

In FIG. 14B, the main-reflector 104 is tilted (tilt angle 126) toward 15 degrees elevation, hence, the beam peak (target beam 132) points toward 30 degrees. For achieving, in this exemplary case, this optimal elevation beam, there is a need to increase the distance between the main-reflector 104 and the fixed sub-reflector 102 relative to the former 10 degrees elevation state. This increase is shown in the current figure as a distance "B" greater than "A" (spacing "B" greater than former spacing "A".

Figure 14C:
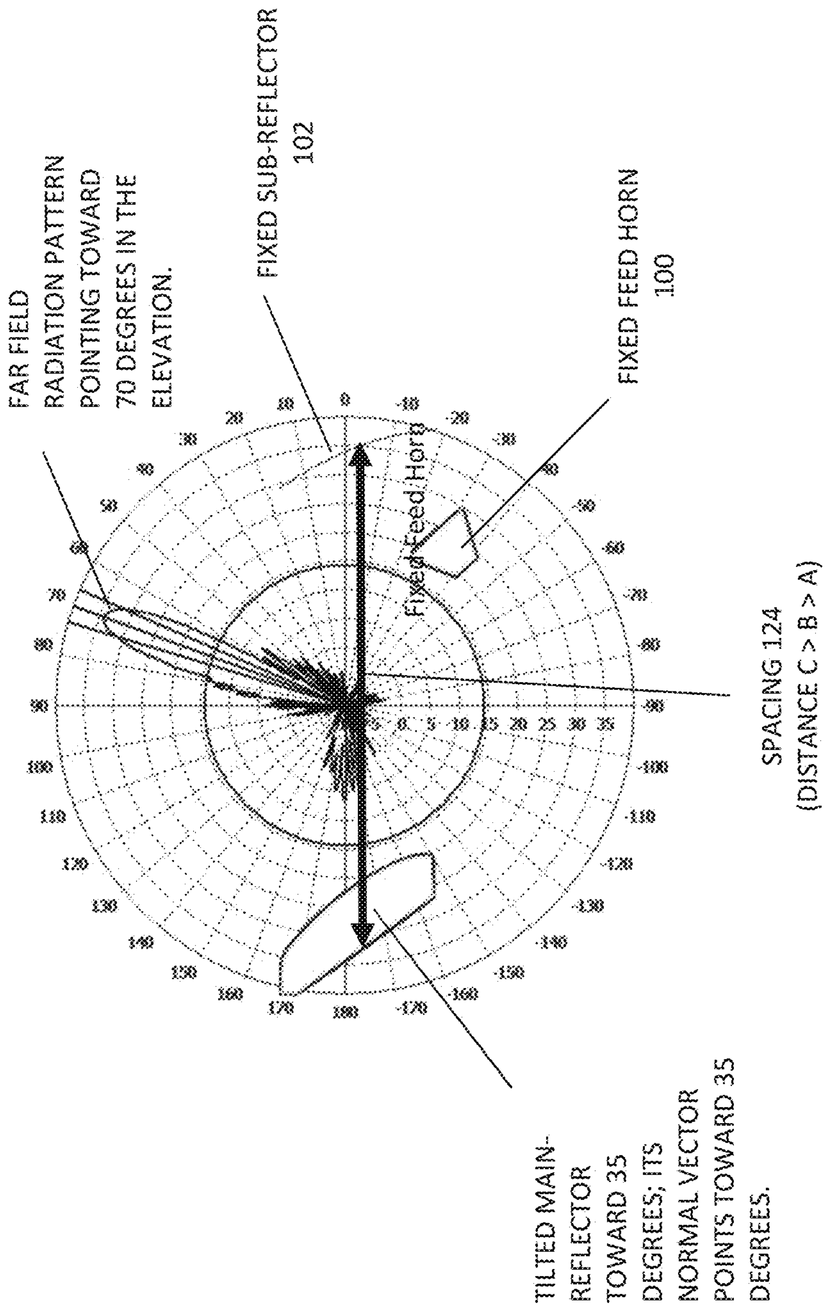

In FIG. 14C, the main-reflector 104 is tilted (tilt angle 126) toward 35 degrees elevation, hence, the beam peak (target beam 132) points toward 70 degrees. For achieving, in this exemplary case, this optimal elevation beam, there is a need to increase the distance between the main-reflector 104 and the fixed sub-reflector 102 relative to the former 30 degrees elevation state. This increase is shown in the current figure as a distance (spacing 124) "C" greater than "B" greater than "A".

Figure 14D:
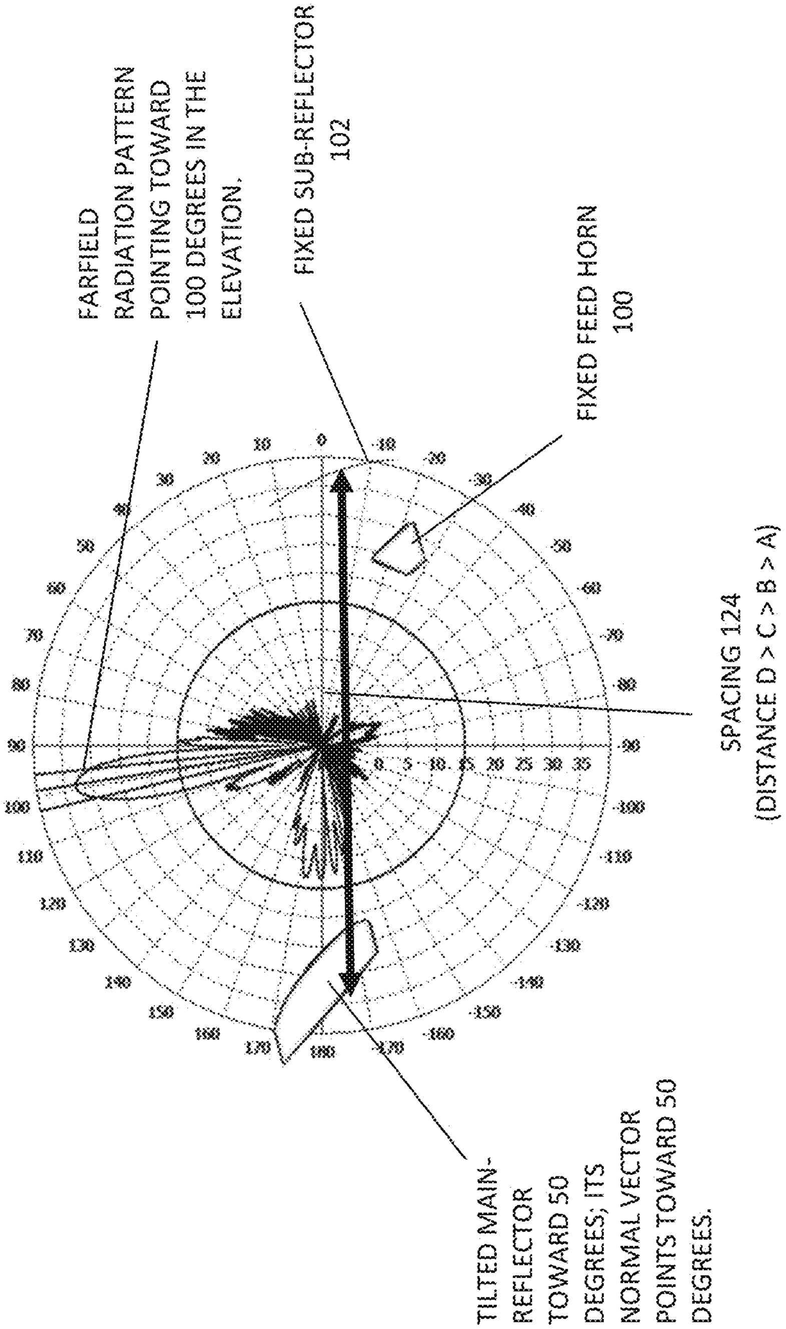

In FIG. 14D, the main-reflector 104 is tilted (tilt angle 126) toward 50 degrees elevation, hence, the beam peak (target beam 132) points toward 100 degrees. For achieving, in this exemplary case, this optimal elevation beam, there is a need to increase the distance between the main-reflector 104 and the fixed sub-reflector 102 relative to the former 70 degrees elevation state. This increase is shown in the current figure as a distance (spacing 124) "D" greater than "C" greater than "B" greater than "A".

Figure 15:
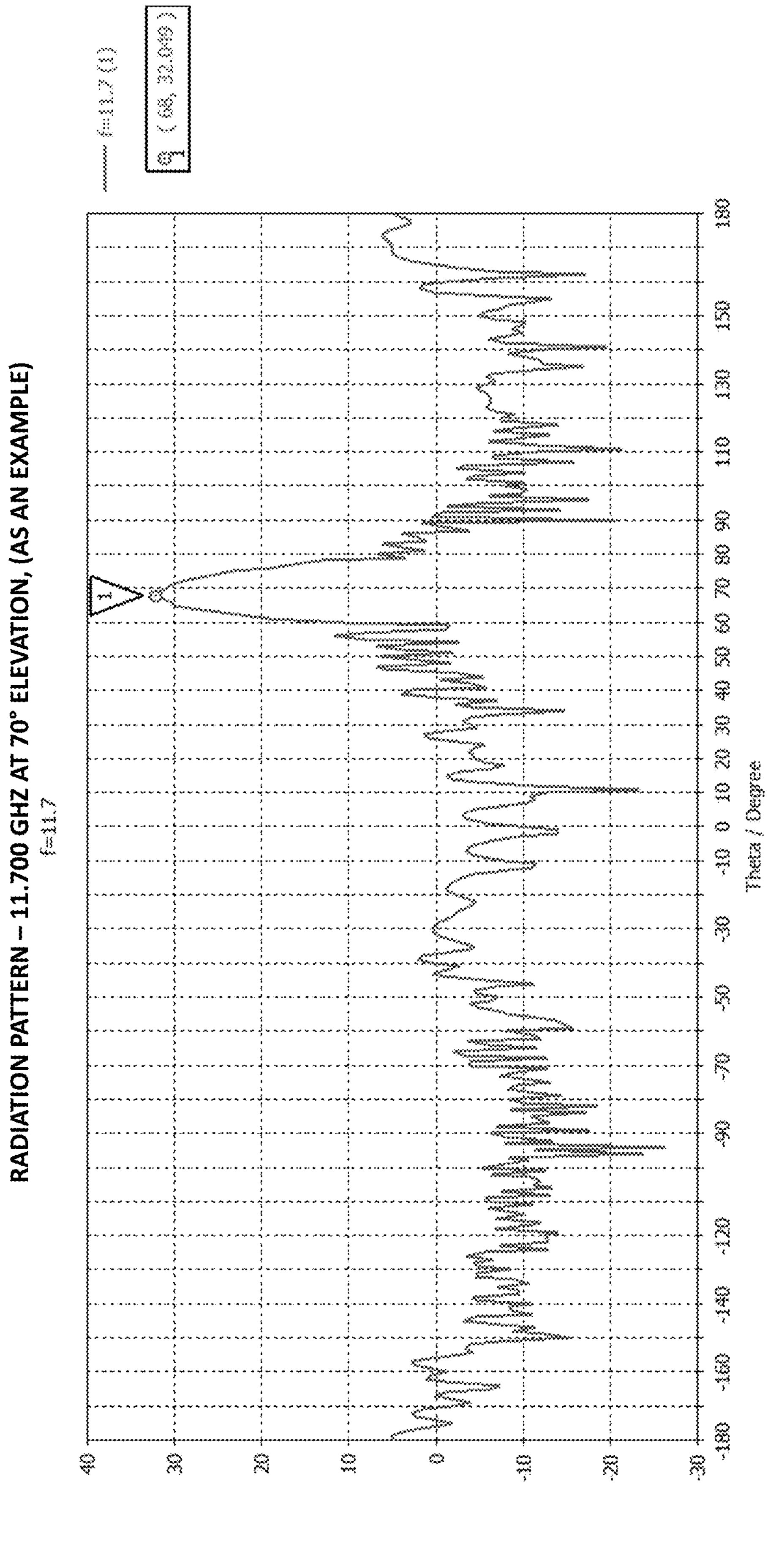
FIG. 15, there is shown an exemplary radiation pattern at 11.700 GHz and 70° elevation.

Referring to FIG. 15, there is shown an exemplary radiation pattern at 11.700 GHz and 70° elevation.

Figure 16:
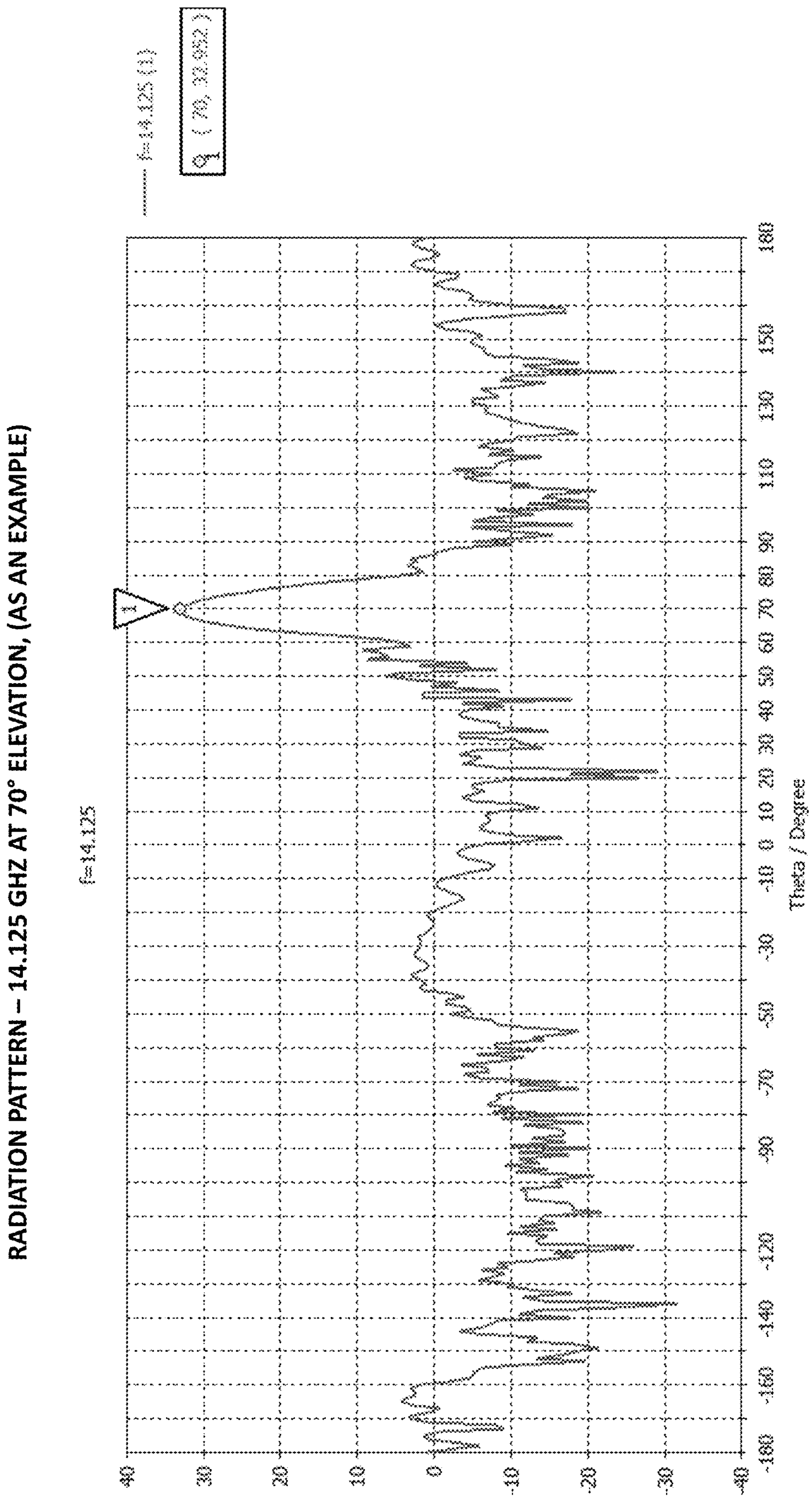
FIG. 16, there is shown an exemplary radiation pattern at 14.125 GHz and 70° Elevation.

Referring to FIG. 16, there is shown an exemplary radiation pattern at 14.125 GHz and 70° Elevation.

Figure 17:
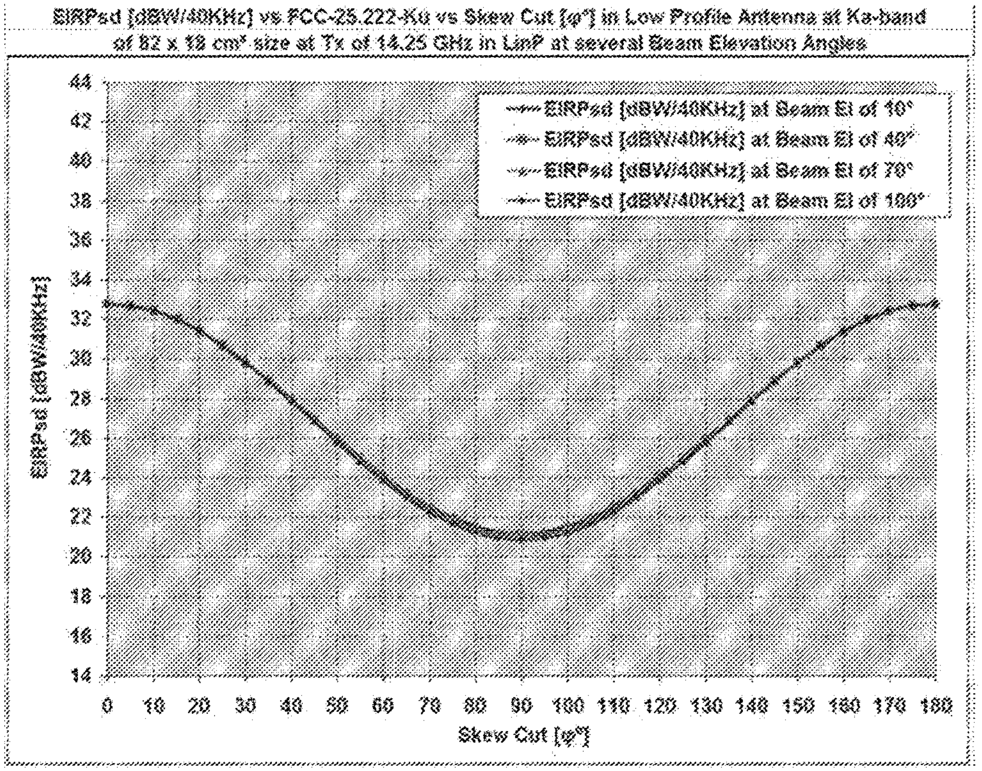
FIG. 17, there is shown a plot of simulated antenna patterns satisfying satcom regulations, EIRPsd vs. Skew angle.

Referring to FIG. 17, there is shown a plot of simulated antenna patterns satisfying satcom regulations, EIRPsd vs. Skew angle, (e.g. @ Ku-Band). The plot is based on analyses for the expected EIRPsd [dBW/40 KHz] in the airborne low-profile antenna system 660 of main-reflector 104 width×height of 82×18 $cm^2$, e.g. vs. FCC-25.222 rule for off-axis emitted EIRP spectral-density.

Figure 18:
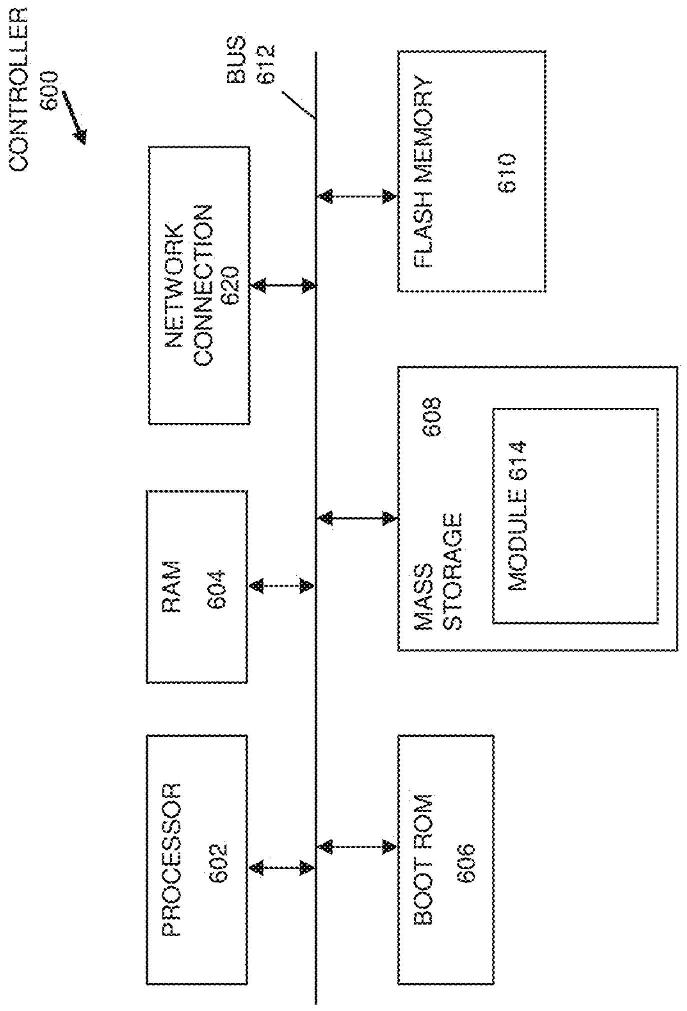
FIG. 18 is a high-level partial block diagram of an exemplary controller configured to implement the antenna positioning

FIG. 18 is a high-level partial block diagram of an exemplary controller 600 configured to implement the antenna positioning of the present embodiment. Controller (processing system) 600 includes a processor 602 (one or more) and four exemplary memory devices: a random-access memory (RAM) 604, a boot read only memory (ROM) 606, a mass storage device (hard disk) 608, and a flash memory 610, all communicating via a common bus 612. As is known in the art, processing and memory can include any computer readable medium storing software and/or firmware and/or any hardware element(s) including but not limited to field programmable logic array (FPLA) element(s), hard-wired logic element(s), field programmable gate array (FPGA) element(s), and application-specific integrated circuit (ASIC) element(s). The processor 202 is formed of one or more processors, for example, hardware processors, including microprocessors, for performing functions and operations detailed herein. The processors are, for example, conventional processors, such as used in servers, computers, and other computerized devices. For example, the processors may include x86 Processors from AMD and Intel, Xenon® and Pentium® processors from Intel, as well as any combinations thereof. Any instruction set architecture may be used in processor 602 including but not limited to reduced instruction set computer (RISC) architecture and/or complex instruction set computer (CISC) architecture. A module (processing module) 614 is shown on mass storage 608, but as will be obvious to one skilled in the art, could be located on any of the memory devices.

Mass storage device 608 is a non-limiting example of a non-transitory computer-readable storage medium bearing computer-readable code for implementing the antenna positioning methodology described herein. Other examples of such computer-readable storage media include read-only memories such as CDs bearing such code.

Controller 600 may have an operating system stored on the memory devices, the ROM may include boot code for the system, and the processor may be configured for executing the boot code to load the operating system to RAM 604, executing the operating system to copy computer-readable code to RAM 604 and execute the code.

Network connection 620 provides communications to and from controller 600. Typically, a single network connection provides one or more links, including virtual connections, to other devices on local and/or remote networks. Alternatively, controller 600 can include more than one network connection (not shown), each network connection providing one or more links to other devices and/or networks.

Controller 600 can be implemented as a server or client respectively connected through a network to a client or server.

Note that a variety of implementations for modules and processing are possible, depending on the application. Modules are preferably implemented in software, but can also be implemented in hardware and firmware, on a single processor or distributed processors, at one or more locations. Module functions, for example on the controller, can be combined and implemented as fewer modules or separated into sub-functions and implemented as a larger number of modules. Based on the above description, one skilled in the art will be able to design an implementation for a specific application.

Note that the above-described examples, numbers used, and exemplary calculations are to assist in the description of this embodiment. Inadvertent typographical errors, mathematical errors, and/or the use of simplified calculations do not detract from the utility and basic advantages of the invention.

To the extent that the appended claims have been drafted without multiple dependencies, this has been done only to accommodate formal requirements in jurisdictions that do not allow such multiple dependencies. Note that all possible combinations of features that would be implied by rendering the claims multiply dependent are explicitly envisaged and should be considered part of the invention.

It will be appreciated that the above descriptions are intended only to serve as examples, and that many other embodiments are possible within the scope of the present invention as defined in the appended claims.

What is claimed is:

1. A system comprising:

(a) a main-reflector (104):

(i) having a first parabolic shape (104HP) in a first direction, and (ii) having a second parabolic shape (104WP) in a second direction, said first shape different from said second shape, said first and second directions orthogonal, (b) a sub-reflector (102):

(i) having a first concave shape (102HP) in said first direction, and (c) a feed (100), said main-reflector and said sub-reflector cooperating to focus an incoming target-beam of radiation on said feed, wherein said first direction corresponds to an elevation direction and said second direction corresponds to an azimuth direction, wherein said main-reflector first parabolic shape (104HP) has a corresponding first focus (90N) of an incoming target beam, wherein said main-reflector second parabolic shape (104WP) has a corresponding second focus (90C) of an incoming target beam, wherein said sub-reflector (102) concave shape (102HP) is effectively elliptical and in the elevation direction has corresponding third focus (90T) and fourth focus (90G), wherein said feed (100) has a feed horn ISO phase center (90F), wherein said first focus (90N) is coincident with said fourth focus (90G), and wherein said third focus (90T) is coincident with said feed horn ISO phase center (90F).

2. The system of claim 1 wherein:

(a) said main-reflector has a main-reflector height (104H) in said first direction, and a main-reflector width (104W) in said second direction, said main-reflector height (104H) less than said main-reflector width (104W), and (b) said sub-reflector has a sub-reflector height (102H) in said first direction, and a sub-reflector width (102W) in said second direction, said sub-reflector height (102H) less than said sub-reflector width (102W).

3. The system of claim 1 wherein said sub-reflector (102) has a planar shape (102WP) in said second direction.

4. The system of claim 1 further comprising:

(a) a controller (600) operational for:

(i) tilting said main-reflector relative to said sub-reflector, and (ii) positioning said main-reflector relative to said sub-reflector (102), said positioning determined based on said tilting.

5. The system of claim 4 wherein:

(a) said tilting of said main-reflector (104) is at a tilt angle (126), said tilt angle relative to a linear axis (108) and a main-reflector normal line (104N), (i) said linear axis is parallel to a line from a main-reflector mechanical center (90M) to a sub-reflector mechanical center (90S), and (ii) said main-reflector normal line (104N) being perpendicular to said first parabolic shape at said main-reflector mechanical center, and (b) said positioning being at a spacing (124) distance between an origin (120) and an axis normal (122), (i) said origin being a normal line from said linear axis at said sub-reflector mechanical center (90S), (ii) said axis normal being a normal line from said linear axis at said main-reflector mechanical center (90M), and (iii) said spacing distance determined based on said tilt angle.

6. The system of claim 4 wherein said positioning of said main-reflector is also relative to said feed (100), said feed in a fixed relation to said sub-reflector.

7. The system of claim 1 further including a linear axis (108), (a) said main-reflector operationally connected to said linear axis and said sub-reflector operationally connected to said linear axis, said main-reflector and said sub-reflector deployed on a top side (108T) of said linear axis, and (b) said feed deployed on a bottom side (108B) of said linear axis, said top side opposite from said bottom side.

8. The system of claim 1 wherein a main-reflector mechanical center (90M) is an area of connection between said main-reflector and mechanics (106), said mechanics deployed to move said main-reflector along a linear axis at least reversibly in the direction of said sub-reflector.

9. The system of claim 1 wherein a sub-reflector mechanical center (90S) is an area of connection between said sub-reflector and a linear axis.

10. A system comprising:

(a) a main-reflector (104):

(i) having a first parabolic shape (104HP) in an elevation direction, and (ii) having a second parabolic shape (104WP) in an azimuth direction, said first shape different from said second shape, (b) a sub-reflector (102):

(i) having a first concave shape (102HP) in said elevation direction, and (c) a feed (100), said main-reflector in an azimuth plane is focused on said sub-reflector in a Cassegrain configuration, and in an elevation plane is focused on said sub-reflector in a Gregorian configuration, said main-reflector and said sub-reflector cooperating to focus an incoming target-beam of radiation on said feed.

11. A method for antenna positioning comprising:

(a) tilting a main-reflector (104) relative to a sub-reflector (102), and (b) positioning said main-reflector relative to said sub-reflector (102), said positioning determined based on said tilting, said main-reflector and said sub-reflector cooperating to focus an incoming target-beam of radiation on a feed, said main-reflector (104): (i) having a first parabolic shape (104HP) in a first direction, and (ii) having a second parabolic shape (104WP) in a second direction, said first shape different from said second shape, said first and second directions orthogonal, said sub-reflector (102): (i) having a first concave shape (102HP) in said first direction, wherein said first direction corresponds to an elevation direction and said second direction corresponds to an azimuth direction, and wherein said main-reflector in the azimuth plane is arranged in a Cassegrain configuration, and in the elevation plane is arranged in a Gregorian configuration.

12. The method of claim 11 wherein:

(a) said tilting of said main-reflector (104) is at a tilt angle (126), said tilt angle relative to a linear axis (108) and a main-reflector normal line (104N), (i) said linear axis is parallel to a line from a main-reflector mechanical center (90M) to a sub-reflector mechanical center (90S), and (ii) said main-reflector normal line (104N) being perpendicular to said first parabolic shape at said main-reflector mechanical center, and (b) said positioning being at a spacing (124) distance between an origin (120) and an axis normal (122), (i) said origin being a normal line from said linear axis at said sub-reflector mechanical center (90S), (ii) said axis normal being a normal line from said linear axis at said main-reflector mechanical center (90M), and said spacing distance determined based on said tilt angle.

13. The method of claim 11 wherein said positioning of said main-reflector is also relative to said feed (100), said feed in a fixed relation to said sub-reflector.

14. A method for antenna positioning comprising:

(a) tilting a main-reflector (104) relative to a sub-reflector (102), and (b) positioning said main-reflector relative to said sub-reflector (102), said positioning determined based on said tilting, said main-reflector and said sub-reflector cooperating to focus an incoming target-beam of radiation on a feed, said main-reflector (104) having a first parabolic shape (104HP) in a first direction, and having a second parabolic shape (104WP) in a second direction, said first parabolic shape (104HP) different from said second parabolic shape (104WP), said first and second directions orthogonal, said first direction corresponding to an elevation direction and said second direction corresponding to an azimuth direction, said sub-reflector (102) having a first concave shape (102HP) in said first direction, said main-reflector first parabolic shape (104HP) having a corresponding first focus (90N) of an incoming target beam, said main-reflector second parabolic shape (104WP) having a corresponding second focus (90C) of an incoming target beam, said sub-reflector (102) concave shape (102HP) is effectively elliptical and in the elevation direction having corresponding third focus (90T) and fourth focus (90G), and said feed (100) having a feed horn ISO phase center (90F), said first focus (90N) coincident with said fourth focus (90G), and said third focus (90T) coincident with said feed horn ISO phase center (90F).

15. A controller operational for:

(i) tilting a main-reflector (104) relative to a sub-reflector (102), said tilting at a tilt angle, said tilt angle relative to a linear axis and a main-reflector normal line, said main-reflector (104) having a first parabolic shape (104HP) in in an elevation direction, and having a second parabolic shape (104WP) in an azimuth direction, said first shape different from said second shape, said sub-reflector (102) having a first concave shape (102HP) in said elevation direction, said main-reflector (104) in the azimuth plane arranged in a Cassegrain configuration, and in the elevation plane arranged in a Gregorian configuration, and (ii) positioning said main-reflector relative to said sub-reflector (102), said positioning being a spacing (124) between an origin (120) and an axis normal (122), said spacing being a distance determined based on said tilting, (iii) said tilting and positioning configuring said main-reflector and said sub-reflector to cooperate to focus an incoming target-beam of radiation on a feed.

* * * * *